United States Patent
Daoura et al.

(10) Patent No.: US 10,592,849 B2
(45) Date of Patent: Mar. 17, 2020

(54) CELLULAR DEVICES, SYSTEMS AND METHODS FOR LOGISTICS SUPPORT

(71) Applicant: PB, Inc., Renton, WA (US)

(72) Inventors: Daniel J Daoura, Renton, WA (US); Nicholas R Pearson-Franks, Renton, WA (US)

(73) Assignee: PB, Inc, Issaquah, WA (US)

( * ) Notice: Subject to any disclaimer, the term of this patent is extended or adjusted under 35 U.S.C. 154(b) by 0 days.

(21) Appl. No.: 15/990,682

(22) Filed: May 27, 2018

(65) Prior Publication Data
US 2018/0341911 A1   Nov. 29, 2018

Related U.S. Application Data

(60) Provisional application No. 62/528,071, filed on Jul. 1, 2017, provisional application No. 62/512,174, filed on May 29, 2017.

(51) Int. Cl.
   *G01K 1/16*     (2006.01)
   *G06Q 10/08*    (2012.01)
   (Continued)

(52) U.S. Cl.
   CPC ........ *G06Q 10/0833* (2013.01); *H04W 4/029* (2018.02); *G06K 7/10297* (2013.01); *G06K 7/1417* (2013.01)

(58) Field of Classification Search
   CPC .. G01K 1/08; G01K 1/14; G01K 1/16; G01K 3/005; G01K 13/00
   See application file for complete search history.

(56) References Cited

U.S. PATENT DOCUMENTS

2017/0016773 A1*   1/2017   Arai .................... G01K 1/02

* cited by examiner

Primary Examiner — Said M Elnoubi

(57) ABSTRACT

Autonomous cellular transceivers for data logging, tracking and managing shipments, the devices having auto-provisioning capability. To auto-provision itself, the cellular device must be associated in a digital record with a particular shipment or object based on physical attachment or proximity—without manual assistance. Subsequent logging, tracking and managing records in a database or databases accessible to one or more users must be updated to reflect that assignment. Auto-provisioning is achieved by associating a cellular identification number of the autonomous cellular device with a shipment or object having a unique shipping identification number or an inventory identification number. Once the identifiers are coupled, the system creates a "shipment profile" of relevant data collected by a sensor or sensors on the cellular device while en route. The system will monitor, log, and report timepoint, waypoint, condition of the goods (as evidenced or extrapolated from sensor data) while in transit. Upon delivery, when polled, or at intervals, the system may publish a link to the data and/or a summary of the shipment status and condition, and push that link onto smart devices held by decision makers and agents in the logistics management tree. In a first instance, termed here "contextual auto-provisioning", capture of location, direction of motion, and time of departure, and so forth, with correlation to known delivery routes, schedules, sounds, and other granular data, is used for autonomous data provisioning. Other means for auto-provisioning include "RFID piggyback means" and "cellular ranked ping means". In a preferred application in cold chain monitoring, once self-assignment is made, the cellular device will log shipment temperature during transit and the cellular device or system will interrogate cellular networks for location and time. Reporting is by cellular radio, and can include temperature, location by cellular triangulation, projected arrival time, and any alarm notifications, for example. Reports can be directed to smart phones, to mobile clients more generally, and to cloud-hosted administrative services. Uses in logistics also include monitoring shipments for exposure to volatiles, humidity, or shock outside of accepted limits, or any diver- (Continued)

sion, delivery error, or delay of goods, particularly as applied to perishable goods such as foodstuffs and pharmaceuticals, or to manage inventory of items such as bulk materials, gas cylinders, blood bags, and so forth.

6 Claims, 14 Drawing Sheets

(51) Int. Cl.
*H04W 4/029* (2018.01)
*G06K 7/14* (2006.01)
*G06K 7/10* (2006.01)

AUTOPROVISIONING

AUTOPROVISIONING

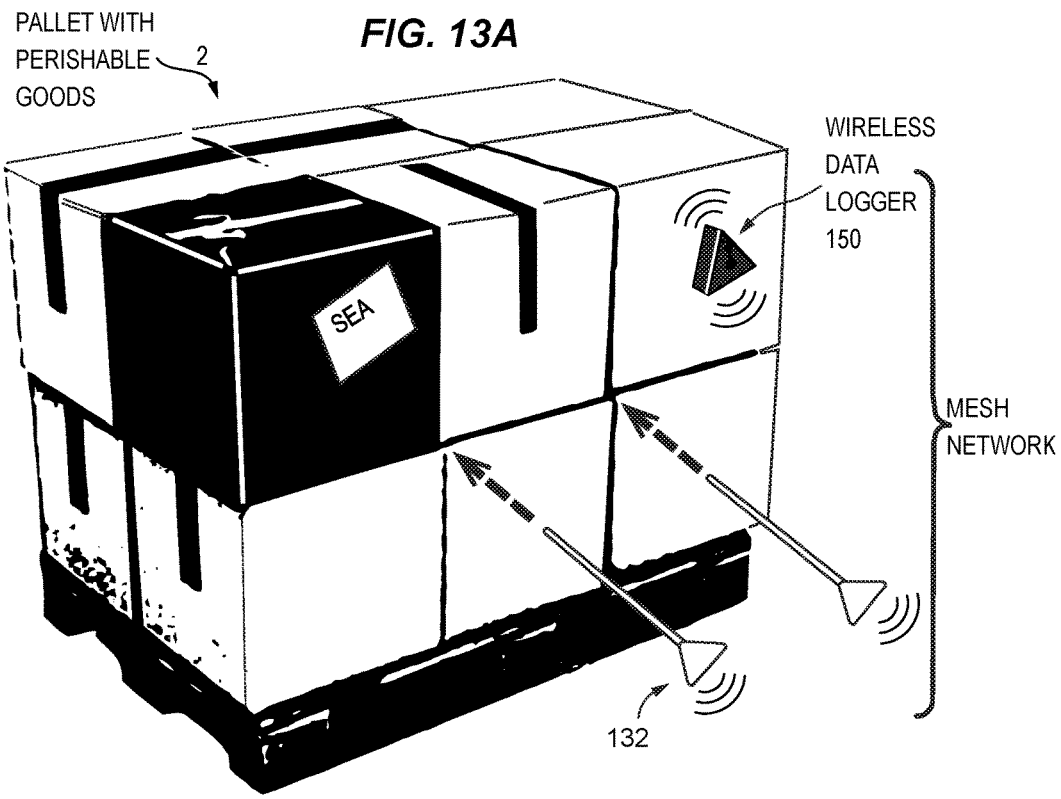
FIG. 13A
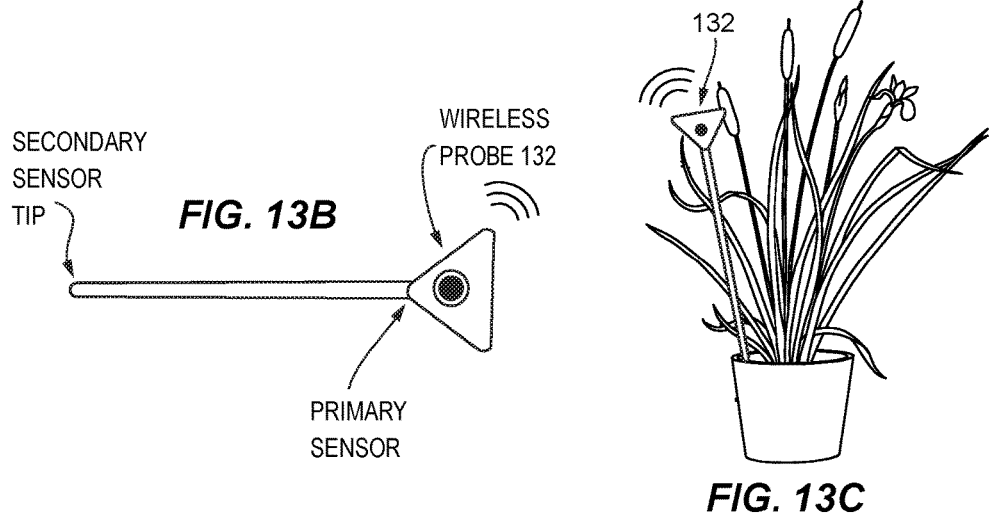
FIG. 13B
FIG. 13C

CELLULAR DEVICES, SYSTEMS AND METHODS FOR LOGISTICS SUPPORT

CROSS REFERENCE TO RELATED APPLICATIONS

This application is related to and claims priority to U.S. Provisional Patent Appl. No. 62/512,174 filed May 29, 2017 and to U.S. Provisional Patent Appl. No. 62/528,071 filed Jul. 1, 2017, which are herein incorporated in full by reference for all purposes.

GOVERNMENT SUPPORT

Not Applicable.

TECHNICAL FIELD

The present invention relates to systems, devices and methods for monitoring and managing shipments of goods, in which cellular transceivers collect data and report status, condition, and tracking of shipments of goods; and a cellular network host generates local and remote alarms if there are deviations.

BACKGROUND

"Data Provisioning" is a process of loading data onto a digital platform from other platform(s) so that it can be accessed and manipulated in a new context provided by the new platform.

Here this approach is extended so that provisioning is achieved by assigning a cellular identification number of a cellular device or "cellular tag" to a particular shipment or object having a shipping identification number or an inventory identification number in a database. The cellular device is physically associated with the shipment or object, generally by a process of attachment, and the challenge is to eliminate the need for a human operator to join the tag to the database.

Conventionally, a database may be "translated" so as to load previously defined "fields" in a new database, but the process requires strict data formatting and is typically a batch process that is run once or periodically. The capacity of a system to do data provisioning "on the fly" in a complex business environment is much less familiar. Errors and anomalies in data provisioning can lead to losses in reputation, expensive delays, and damaged or lost goods, for example. System engineers typically spend more time on data provisioning and preparation of data than on modeling, analyzing and improving work flows.

In the context of the shipping business, data provisioning generally involves a manual process in which a shipping agent scans a numerical identifier embedded in a barcode or an RFID chip and associates the numerical identifier with a particular shipment identifier and manifest in the carrier's database. The initial customer's database can contain origin, destination, identification of the goods, timelines, insurance, and so forth. The task of the carrier is to load this information into a database having shipping routes, truck numbers, drivers, rail lines, airport hubs, connecting flights, conveyer belts, zip codes, and so forth. Machine logic is capable of sorting the shipments and determining a best way of achieving the required delivery date using available shipping resources, but is not capable of coupling a numerical identifier assigned by a customer for tracking a particular shipment with a shipment identifier assigned by the shipping agent.

Of course the same numerical identifier (ID) may be used for both databases, but until the ID is consolidated in those databases, there is no way organize the process of delivery because the shipment itself, a box, a pallet, a truckload, whatever it is, is not physically mapped in the carrier's business inventory. Typically, the shipment information is manually received and entered by a shipping agent, either by accessing the customer's data on line or by entering it from annotations on an order chit.

The process of data provisioning generally involves two separate steps, one a process of extracting needed information from the customer, such as destination. The second part is a set of rules or functions that load the data into the carrier's system of databases and processes, and the system coordinates use of the carrier's resources according to a strict timeline. Creating, preparing, and enabling a network to provide data to customers interested in tracking the shipment and to shippers needful of efficiency requires that data must be cross-loaded to a new platform before it can be accessed by a front-end tool designed to receive and answer system queries. Generally, the initial step is a manual process, as illustrated by U.S. Pat. No. 9,552,565 to UPS®, in which physically scanning a barcode or an RFID label is used to bring shipments into the system and to match them with destinations and routing. This ID will be scanned again at various checkpoints in the carrier's logistic network and the shipment redirected as needed.

The literature teaches, "One or more machine readable codes may be placed on the exterior of the shipping container, payload containers within the shipping container, and/or articles in the payload containers. When read on receipt, these codes may direct a computing device at the receiving location to a database which may contain: (1) a list of the products in the shipment, and/or (2) instructions on putting the contents of the shipment into a particular freezer or a particular refrigerator, or instructions on putting a portion of the contents into one freezer or refrigerator and for putting other portions of the contents into a different freezer or refrigerator. The instructions may also prompt the user to provide information that allows the system to confirm that the contents were received in good condition, or to address missing or damaged contents." This description demonstrates that there is a manual step that cannot be automated because the delivery again requires data provisioning the customer's database before shipment can be matched with the customer's inventory and accepted by a receiving agent. Thus we see data provisioning issues at both ends of the supply chain.

Adding to this complicated problem are issues associated with special handling, such as for perishable goods. A monitoring system is needed to report whether environmental conditions were acceptable at all times during transit in the carrier's logistics network between checkpoints. Without monitoring, the customer cannot know whether biological solutions were brought to a near boil in Blythe on the way to Salt Lake City from San Francisco, for example. Similarly, foodstuffs may be damaged without the customer's knowledge. In some instances, problems in shipping may result in delivery of goods that are no longer fit for use because of unacceptable environmental exposures during transit. If mistreated during shipping, shipments may be damaged and may even be dangerous to the end user. These concerns cannot be resolved without substantial waste of transportation, labor, financial, and other resources of the carrier and the customer, particularly given the lack of automated support available for monitoring and assessing environmental conditions during transit.

Therefore, a need exists in the art for a method and system for monitoring shipments of sensitive goods such as in a cold chain. The method and system must provide a way of verifying whether or not certain environmental conditions are maintained throughout the shipping process for a product and preferably can automate the process of filing a claim if the goods are delivered without adequate verification of their handling conditions. Similar issues are found in inventory management.

More generally, there is a need for improved methods and systems of provisioning, tracking and receiving packages requiring special handling, for sharing data and handling instructions for these packages, and for reducing the potential for improper handling of the packages.

Today the process of accessing data is very archaic and requires manual access to construct and retrieve a shipping profile. A need exists for autonomous devices and networked systems to accurately and automatically provide a real time shipment profile on the cloud, accessible to users via shipment-specific hyperlinks, with little to no risk of human error, and for the same cost as a USB data/temperature logger. These and other data provisioning issues are addressed by the systems and methods of the invention.

SUMMARY

Management of delivery quality assurance and improved "hands free" efficiency is achieved with autonomous devices and systems engineered to auto-provision shipping data. Cellular tracking devices are deployed as data loggers. The tracking devices are small, portable and disposable and are intended to be attached to a shipment. Each tracking device includes a cellular transceiver and a cellular identifier (CID), and will ping cellular towers along the route taken by the shipment. Data from the tracking devices is shared with a system host and with system clients in order to assess shipment status. A history of environmental conditions that the shipment is exposed to may be constructed from the data anytime and anywhere.

On activation, the tracking device associates itself with a shipment line item in a carrier's database, merging the data records of the customer and the carrier with the CID of the cellular device in a process termed "auto-provisioning". The tracking device rides with a shipment and are used to track, monitor and wirelessly report status and environmental conditions while in transit and upon delivery, both locally and remotely.

Autonomous data provisioning refers to the capacity of the tracking device to capture critical data needed to identify an intended destination and customer data; including any special handling orders. For example, in "contextual auto-provisioning", capture of location, direction of motion, time, and context, with correlation to known delivery routes and schedules, may be used to identify the shipment and the expected destination. This is confirmed by monitoring en route or again at the delivery location, and any anomalies are reported for resolution in real time. In "piggyback auto-provisioning", the cellular device includes an RFID reader, and can provision itself by reading the RFID tag label and then consulting an existing database to collect the needed destination, customer data, and special handling orders. In "ranked ping auto-provisioning" the system identifies a cellular ping of a driver or agent and interprets the driver or agent's behavior with respect to a shipment in order to associate that shipment with the device's CID.

Thus the devices, systems and methods of the invention are distinguished by the capacity to eliminate manual means for associating a data logger with a particular package or shipment. The system also differentiates itself by allowing subscribers to access shipping profiles generated by the tracking device on their preferred smart device and WAN or LAN through hyperlinks, individually, in groups, or according to user criteria (such as shipments in alarm, shipments to Canada, shipments of O-Neg blood, etc.). Smart reports are formatted according to subscriber needs. Also, the device itself offers local alarm capability, and for example can activate an audible alarm when a particular smart device approaches, when a truck is opened at a delivery point, or when a customer is detected, and can prepare and distribute automated delivery reports (or prepare insurance claims) for the appropriate management groups at a destination or in transit, all without human initiative or intervention.

In a first example, a device is actuated on a loading dock and is physically attached to a shipment on a pallet. The device contacts a system administrative host. Based on current location, scheduled departures, a truck manifest may be queried to identify a list of possible shipment identifiers SIDs. Movement of the truck at a designated time and in a designated direction confirms that the truck is carrying a particular shipment to which the particular device is attached. The shipment identifier is associated with the CID of the device so that data and reports collected by the device are logged as part of the history of that particular shipment. Data transmission over a cellular network eliminates the need for manual download from a data logger. The SID is now associated with a particular CID of a cellular device that rides on board with the shipment, periodically calls home, and automates typical shipping management tasks. Essentially, the invention provides a device and system for cellular shipment monitoring and management at the cost of a USB data logger, an advance in the art.

The physical tracking device itself is also configured to display status under control of a cloud host. The device is a messaging board and the message may be as simple as an LED or a beeper, or even a voice synthesizer. A simple go-no-go status indicator may be displayed on arrival at a destination or whenever a human body is detected. The status indicator will exhibit an alarm state if the shipment has been outside of acceptable temperature, for example, or if the shipment has been diverted from an accepted route for any period of time. Status indicators may be visual or audible and may be ported directly to local cellular smart devices operated by a receiving agent. The receiving agent can query the administrative host to see the data log, but the status indicator is displayed so that anyone receiving the shipment is alerted to a problem.

Remote alarm broadcast in real time is also envisaged, and has the advantage that human proximity is not required, so that any condition of the shipment that is an out-of-bounds condition or is trending to an out-of-bounds condition can be flagged or even prevented by an intervention at the time the trend is detected by the on-board sensor(s).

Because the devices are set up as cellular transceivers, they can be pinged (i.e., interrogated) directly by the receiving agent upon arrival or will ping the receiving agent when arrival is imminent. Remote status reporting includes location (most readily by cellular tower triangulation), and accurate projections of arrival time. Reports can be directed to smart phones, to mobile devices more generally, and to cloud-hosted administrative services.

Data does not have to be manually downloaded from a device memory as is typical for conventional data loggers. Uses in commerce include any special handling needs that require monitoring for exposure to temperature, moisture, or shock, outside of accepted limits, for example, or any diversion or delay of goods. Applications are conceived for shipments of perishable goods including foodstuffs such as produce and meat, pharmaceuticals, blood products, live organisms, and vaccines for example, or anything that is spoilable or likely to quickly degrade when held at suboptimal conditions and may be monitored for quality assurance during shipping.

Logged data is reported to a cloud host via a remote feed from the device and the information can be "attached" to the package so that appropriate action is taken, such as the filing of a claim if the goods become unacceptable for their intended use. This can occur in transit so that the shipper has the opportunity to replace the goods, or on arrival, so that the customer's receiving agent can refuse the goods. Higher levels of automation increase efficiency.

The cloud service can also be used to signal to a customer that the goods are about to be or have been delivered and even to upload information about their precise location, so that the customer can quickly retrieve the shipment if it has been left in the sun or rain, or in an unsecure location. The cloud service may also push a delivery alert directly to the customer so that deliveries to an incorrect address are prevented.

The devices may also include porting for Bluetooth low energy radio sensors, and slaved sensors may be dispersed in a shipment as a mesh network so as to monitor representative temperatures throughout a shipment volume. The devices may be monitored by a hub in a shipping container, truck or rail car; the hub serving as a cellular platform to communicate to a remote server.

Updates to a logistics network are readily implemented because the devices are self-contained and are generally single use.

The elements, features, steps, and advantages of the invention will be more readily understood upon consideration of the following detailed description of the invention, taken in conjunction with the accompanying drawings, in which presently preferred embodiments of the invention are illustrated by way of example.

It is to be expressly understood, however, that the drawings are for illustration and description only and are not intended as a definition of the limits of the invention. The various elements, features, steps, and combinations thereof that characterize aspects of the invention are pointed out with particularity in the claims annexed to and forming part of this disclosure. The invention does not necessarily reside in any one of these aspects taken alone, but rather in the invention taken as a whole.

BRIEF DESCRIPTION OF THE DRAWINGS

The teachings of the present invention are more readily understood by considering the drawings, in which.

Figure 12A:
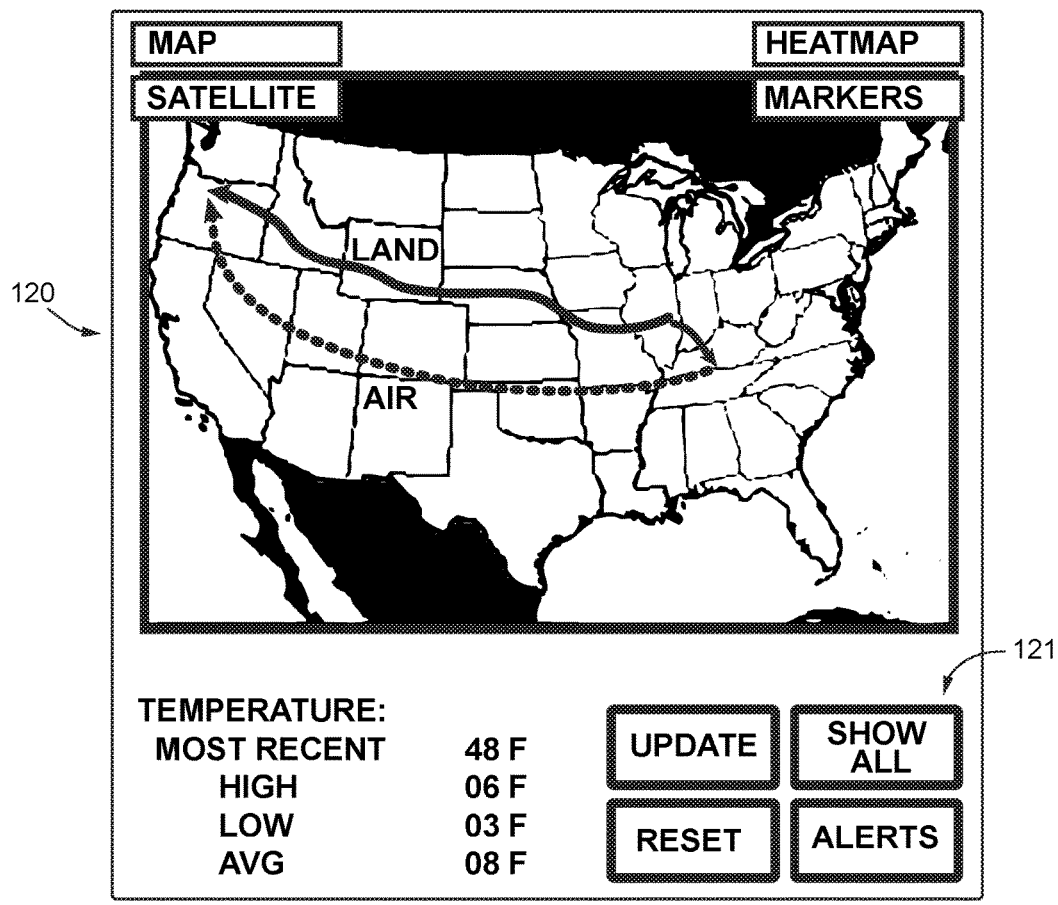
In FIG. 12A, a sample run from Chicago to a destination in Seattle is shown as would be mapped on a screen of a smart device. The solid lines represent land routes, including an extended cross-country truck route; the dotted is air freight, representing a potential air/truck combination route.
Figure 12B:
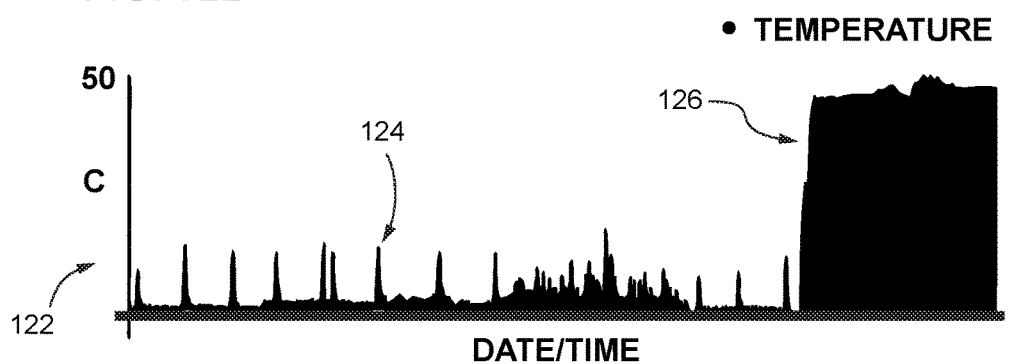

A temperature profile over the duration of the trip is shown in FIG. 12B.

FIG. 13A is a graphical concept of a set of slave sensor probes as a mesh network distributed through a shipment volume.

More detail of a slave probe is shown in FIG. 13B. A use for measuring humidity is suggested in FIG. 13C.

Figure 14:
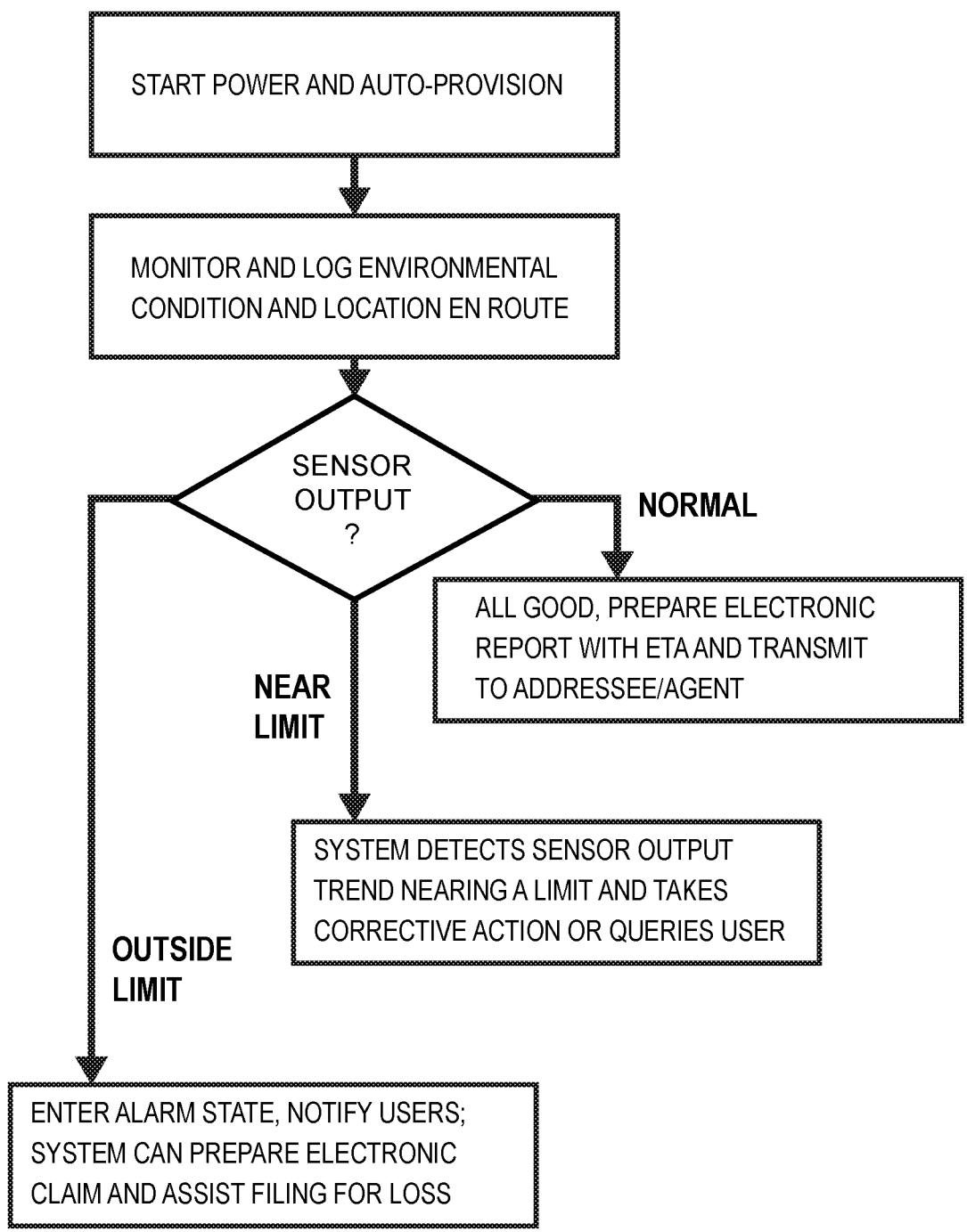

FIG. 14 is an overview of a system and method for monitoring and managing shipments.

The drawing figures are not necessarily to scale. Certain features or components herein may be shown in somewhat schematic form and some details of conventional elements may not be shown in the interest of clarity, explanation, and conciseness. The drawing figures are hereby made part of the specification, written description and teachings disclosed herein.

Glossary

Certain terms are used throughout the following description to refer to particular features, steps or components, and are used as terms of description and not of limitation. As one skilled in the art will appreciate, different persons may refer to the same feature, step or component by different names. Components, steps or features that differ in name but not in structure, function or action are considered equivalent and not distinguishable, and may be substituted herein without departure from the invention. The following definitions supplement those set forth elsewhere in this specification. Certain meanings are defined here as intended by the inventors, i.e., they are intrinsic meanings. Other words and phrases used herein take their meaning as consistent with usage as would be apparent to one skilled in the relevant arts. In case of conflict, the present specification, including definitions, will control.

"Shipping carriers" are persons or entities who/that transport products on behalf of customers. In most cases, a carrier's customer is either a sender (or "consignor") or a receiver (or "consignee"), or both. As the terms are used herein, a "sender" refers to the person or entity sending the product to a receiver via the carrier, and the "receiver" is the person or entity receiving the product from the sender via the carrier. Such persons or entities may also be termed system "users".

"Unique identifiers" are used to track shipments. These can include shipping unique identifiers (SID) and cellular unique identifiers (CID). Also of interest in multilevel networks are Bluetooth Unique Identifiers (BID). All are generally a string of alphanumeric characters, and may be represented by a bar code or an RFID chip, may be encoded in a microprocessor, or assigned by a system host. A customer or other interested party with the SID can access tracking information by providing the SID to a representative. The representative can reference the computerized shipping records in a carrier's database to provide the requested status information. More commonly, carriers permit customers to directly access shipment tracking information through web-based portal.

"Data Provisioning" is a process of loading data onto one platform from another platform so that it can be accessed and manipulated in a new context provided by the new platform. Databases can be "translated" so as to load data into defined fields in a new database, but the process requires a very formal and rigid translation with no flexibility or intelligence and is typically a batch process that is run once or periodically. In logistics, "auto-provisioning" is the acquisition of a data from one database for use in another without manual assistance. More particularly, auto-provisioning may be a process for assigning a cellular unique identifier (CID) of a tracking device to a unique shipment of goods so that the CID and a shipment unique identifier SID are coupled in at least one database. Physical attachment of the tracking device automatically "tags" the shipment with a cellular unique identifier, an advance in the art.

"Data logger" is a term of art referring to a generally small device that accompanies a shipment and collects environmental data during shipment. For example, a device is associated with a package and monitors the temperature of a product in the package or an outside temperature to determine if the product may have been damaged because it was not kept within a required temperature range during shipment.

The term "special handling" encompasses a variety of operations in which particular products (or a shipment of products) are identified and separated from routine product shipments to be handled differently from routine product shipments in the shipping carrier's transportation and storage system. Such special handling can include, for example, transporting sensitive, perishable, explosive, hazardous, or toxic products in a special way. Such handling can be mandated by applicable law or regulation for shipment of the product, can be necessary in order to comply with a customer's request for handling the product, or can be necessary due to the carrier's internal policies or experiences with products of a particular nature. For example, the carrier can be asked by a customer or third party to verify that a refrigerated container holding biological material is functioning at various points along the container's shipping route.

A cellular network or mobile network is any communication network where the last link is cellular. The network is distributed over land areas called cells, each served by at least one fixed-location transceiver, known as a cell site or base station. Cellular systems include specialized addressing and encoding such as CDMA, FDMA, TDMA so that individual signals can be multiplexed and then isolated, whereby distributed transceivers can select one cell and listen to it within the coverage area of a single cell.

The term "coupled" is defined as meaning having a connection between an element in one database and another element or elements in another database. In the context of this invention, the meaning relates particularly to the coupling of an SID with an CID.

General connection terms including, but not limited to "connected," "attached," "conjoined," "secured," and "affixed" are not meant to be limiting, such that structures so "associated" may have more than one way of being associated. "Digitally connected" indicates a connection in which digital data may be conveyed therethrough. "Electrically connected" indicates a connection in which units of electrical charge are conveyed therethrough. "Wirelessly connected" indicates a connection made by radio waves.

Relative terms should be construed as such. For example, the term "front" is meant to be relative to the term "back," the term "upper" is meant to be relative to the term "lower," the term "vertical" is meant to be relative to the term "horizontal," the term "top" is meant to be relative to the term "bottom," and the term "inside" is meant to be relative to the term "outside," and so forth. Unless specifically stated otherwise, the terms "first," "second," "third," and "fourth" are meant solely for purposes of designation and not for order or for limitation. Reference to "one embodiment," "an embodiment," or an "aspect," means that a particular feature, structure, step, combination or characteristic described in connection with the embodiment or aspect is included in at least one realization of the present invention. Thus, the appearances of the phrases "in one embodiment" or "in an embodiment" in various places throughout this specification are not necessarily all referring to the same embodiment and may apply to multiple embodiments. Furthermore, particular features, structures, or characteristics of the invention may be combined in any suitable manner in one or more embodiments.

"Adapted to" includes and encompasses the meanings of "capable of" and additionally, "designed to", as applies to those uses intended by the patent. In contrast, a claim drafted with the limitation "capable of" also encompasses unintended uses and misuses of a functional element beyond those uses indicated in the disclosure. Aspex Eyewear v Marchon Eyewear 672 F3d 1335, 1349 (Fed Circ 2012). "Configured to", as used here, is taken to indicate is able to, is designed to, and is intended to function in support of the inventive structures, and is thus more stringent than "enabled to".

It should be noted that the terms "may," "can," and "might" are used to indicate alternatives and optional features and only should be construed as a limitation if specifically included in the claims. The various components, features, steps, or embodiments thereof are all "preferred"

whether or not specifically so indicated. Claims not including a specific limitation should not be construed to include that limitation. For example, the term "a" or "an" as used in the claims does not exclude a plurality.

"Conventional" refers to a term or method designating that which is known and commonly understood in the technology to which this invention relates.

Unless the context requires otherwise, throughout the specification and claims that follow, the term "comprise" and variations thereof, such as, "comprises" and "comprising" are to be construed in an open, inclusive sense—as in "including, but not limited to."

The appended claims are not to be interpreted as including means-plus-function limitations unless a given claim explicitly evokes the means-plus-function clause of 35 USC § 112 para (f) by using the phrase "means for" followed by a verb in gerund form.

A "method" as disclosed herein refers to one or more steps or actions for achieving the described end. Unless a specific order of steps or actions is required for proper operation of the embodiment, the order and/or use of specific steps and/or actions may be modified without departing from the scope of the present invention.

DETAILED DESCRIPTION

As conventionally practiced, shipping workflows are not fully automated. In a typical process, a sender places a product to be shipped in a container or package, fills out and attaches an address label indicating the identity of the receiver and the receiver's address, and leaves the container with the product in a designated place for pickup by the carrier. The address label will likely include other relevant sender information and a shipment identifier (SID), either as a barcode or as a QR code. On pickup, a driver of a carrier vehicle uses a handheld wireless device to enter relevant data from the shipping label into a tracking system so that the time and location of pick up by the carrier is recorded. The driver then loads the package in the vehicle, and transports it to a hub for sorting and distribution. The package is moved along a route designated for the package by the carrier's internal routing and control systems, with logging at any major substations. In some instances, the carrier supplies more than one resource to complete the delivery. These include aircraft, trains, drones, wheeled vehicles, and so forth. In the final leg of the route, a delivery vehicle transports the package to the receiver's location to complete delivery. The receiver can then open the container and check the product's condition before accepting the shipment.

For purposes of routing, tracking, and billing for shipment, the carrier keeps computerized records identifying the sender, the sender's shipping account to be charged for the product shipment, the sender's address, the receiver, the receiver's address for delivery, the level of service selected for shipping the product (i.e., overnight delivery, next-day delivery, two-day delivery, etc.), the weight and dimensions of the container and enclosed product which can be used for logistics planning and billing for the product shipment, special handling instructions for the product, hazardous cargo indications, and any other relevant information.

As known in the art, some carriers provide the capability to track a shipped product in transit from the sender to the receiver. In addition to providing peace of mind to the sender and/or receiver as to the location and status of the product within the carrier's transportation and storage network at any given time, the tracking information can be used to estimate when the product will arrive at the receiver's location. The receiver can thus plan activities that are contingent upon receipt of the product, such as the availability of machinery and labor for handling the product, etc. In addition, tracking information permits the sender or receiver to verify that certain actions, such as shipping or delivery of the product, have in fact been taken. This can be useful for verifying compliance (or determining noncompliance) with a contract between the sender and receiver. Such tracking information can also be useful to interested third parties such as insurers, guarantors, or banks, who may have an interest in a product shipment.

Packages that require special handling may include a dedicated tracking device (also termed a "data logger") that collects data on environmental conditions during shipment. For example, a tracking device may be included in the package that monitors the temperature of an article in the package (or a surface temperature) to determine if a controlled temperature was not maintained. Typically, when a tracking device is included in the package, the tracking device is deactivated and its data retrieved as part of the receiving process before accepting the shipment. If unsatisfactory, the recipient may have to file a claim with the carrier.

Figure 1:
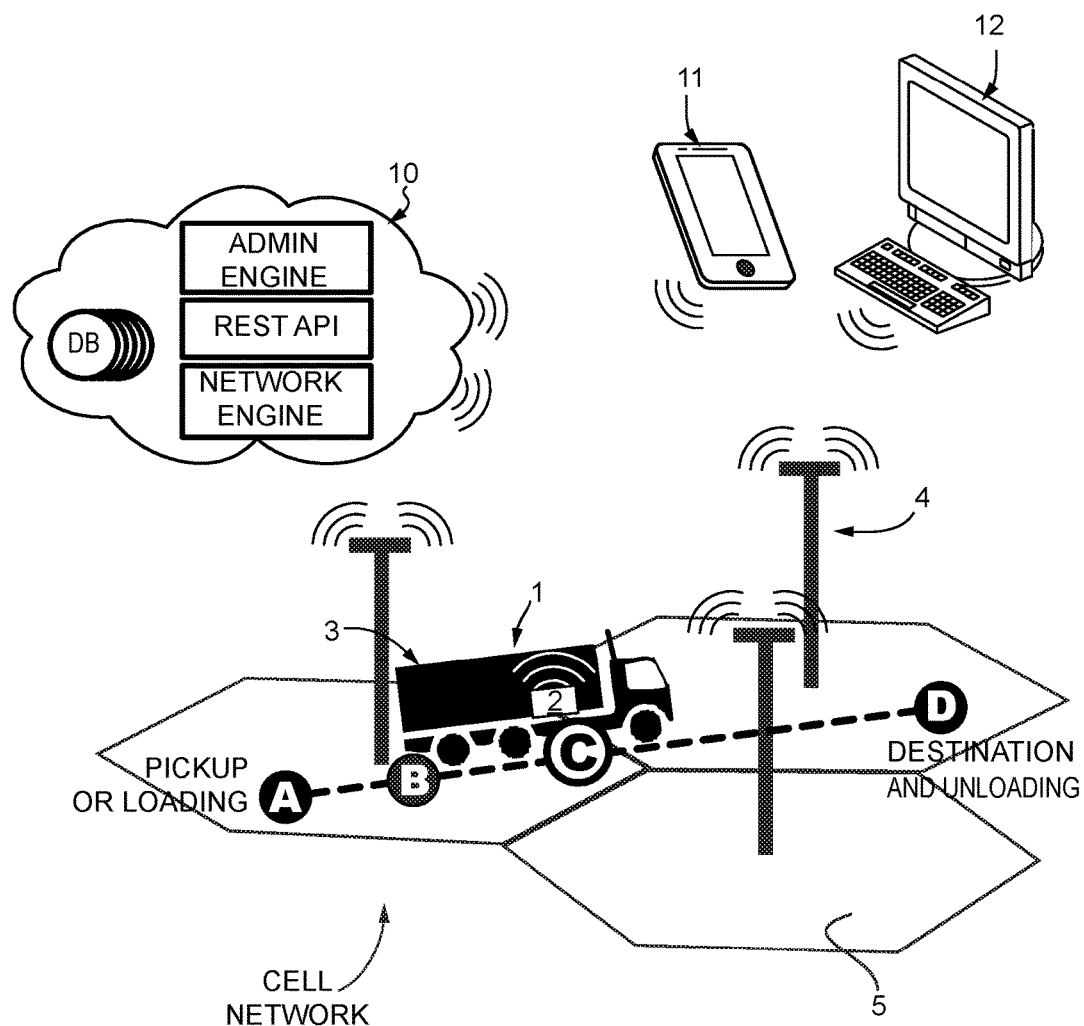
FIG. 1 maps a cloud host, cell towers and other system components for tracking and monitoring a data logger attached to a shipment.

Shipping systems of the invention are easily distinguished by the lack of manual data entry. As shown in FIG. 1, a cloud host 10 handles functions such as pickup (illustrated here by a truck 3) and loading, addressing, routing, delivering and quality assurance. Cell towers 4 are used to track and monitor a data logger 2 attached to the shipment 1 in the truck.

A representative cell network having three cells 5, each with a cell tower, is shown, although routes may be longer or shorter. Four waypoints on a shipping route (dashed line) are shown: A, B, C, and D. Point of origin A is important for data provisioning because the location is associated with a sender/shipper, a billing address needed by the carrier, and instructions regarding special handling. The shipper's instruction to pick up a package is associated with a shipment number SID and a delivery address.

By placing a tracking device on the package at the point of origin and activating it, a complete picture of the delivery instructions can be assembled. The tracking device is assigned a cellular identifier CID and calls home when activated. In a first example of autoprovisioning, accelerometry data from the device's sensors detects movement of the truck, and logic in the host system links the SID to the CID. From this point on, data received by cell from the device is associated with a particular shipment 1 and its line item on a shipping manifest on board truck 3.

In a variant, the carrier's agent taps the tracking device three times to activate it, so that the system can identify which package is being picked up and correlate it with the location of the radio dispatched truck parked at the sender's place of business. Review of shipping requests coupled to the distinctive impact pattern allows the system to couple the SID with the CID. Alternatively, the tracking device can be actuated with a start switch. Once actuated, the device will continue to function until it reaches the destination or runs out of power. Battery reserve is sized for a multiday trip if needed, and location is established by pinging cell towers rather than more energy and computationally expensive GPS means. Data logging of one or more environmental sensor parameters is commenced and all data is held in storage. The device may have some level of autonomous calculating power and may intermittently transmit a report instead of raw data when linked to the host system. The data logger is more likely the host system, and a shipping profile is assembled for access by interested parties and as proof of safe delivery.

At waypoint B, the general direction of the truck is assessed using a magnetometer on the device and the result correlated with an expected route. Alternatively, the tracking device can receive triangulation from surrounding cell towers and can store that data as part of a timeline history with the environmental data collected. If there are no anomalies, the device will go to rest mode.

At waypoint C, the device is awakened by a radio request from the addressee for a status update. In response, the device can assemble a report with SID shipment number, current position, expected arrival time, and any sensor data history. Alternatively, if the device probes have detected an out-of-range sensor condition, then the device can initiate a call to the system host 10. Any alarm condition is also communicated to the addressee. An alarm due to warming of a frozen shipment, for example, is detected and reported in real time, or even proactively. This is an advance in the art and impacts efficiency and quality, closing vulnerabilities in our transportation industries.

The system can assign URLs to data reports and notifications and can transmit them to users. The system can also push the links onto smart devices of users in need of seeing them, such as to notify a receiver of an impending delivery.

System host 10 includes an administrative engine, an interface for engaging multiple user databases and systems, and a network engine for handling communications traffic. The carrier or host also maintains one or more databases for the needed business records and for storing data uploaded by the tracking device. Truck 3 can include a cellular hub of its own, or a wireless hub for long range radio communication, and can boost or relay signals from the tracking device. If desired, the truck hub can also have a precision GPS locator used to correlate the tracking device position and progress the truck is making on the delivery route.

Consumer device 11 is a cellular smart device, and can interface directly with the tracking device 2, or with the host system 10. Data is presented on a graphical interface keyed to the SID or the user account. User's may choose to receive heads up displays when a shipment is about to arrive and notification of any special handling required by the shipper. Users will also receive an alert if there is a deviation in routing or handling. At waypoint D, the tracking device or the host system sends information to smart device 11 that allows a receiving agent at workstation 12, employed by the addressee, to quickly document the shipment and decide whether to accept or not accept a shipment when it arrives at receiving. The receiving agent can also be on the lookout in real time for shipments that have been left outside or are being delivered to the wrong address.

In this way, significant chances are avoided for error due to manual entry mistakes. Efficiency is improved because the driver's role as a clerk is reduced and the tracking device auto-provisions itself with the needed delivery address and routing information to complete the delivery. The tracking device also interfaces using ubiquitous cell service to a host system that handles any queries about the shipment.

The system also has value in addressing anomalies, where shipments have gone off track. If a shipment is being carried to a wrong address, the tracking device location report will not match the expected route, triggering an alert. If the delivery vehicle makes an unexpected stop, because of an accident or because the shipment is diverted, the system will trigger an alert so that help can be summoned. And if the truck breaks down, the system can also calculate how long the shipment can be held at the required temperature, for example, without power to the cooling system, providing supervisors with the information needed to intervene or to dispatch a replacement system immediately if help is not forthcoming.

Figure 2:
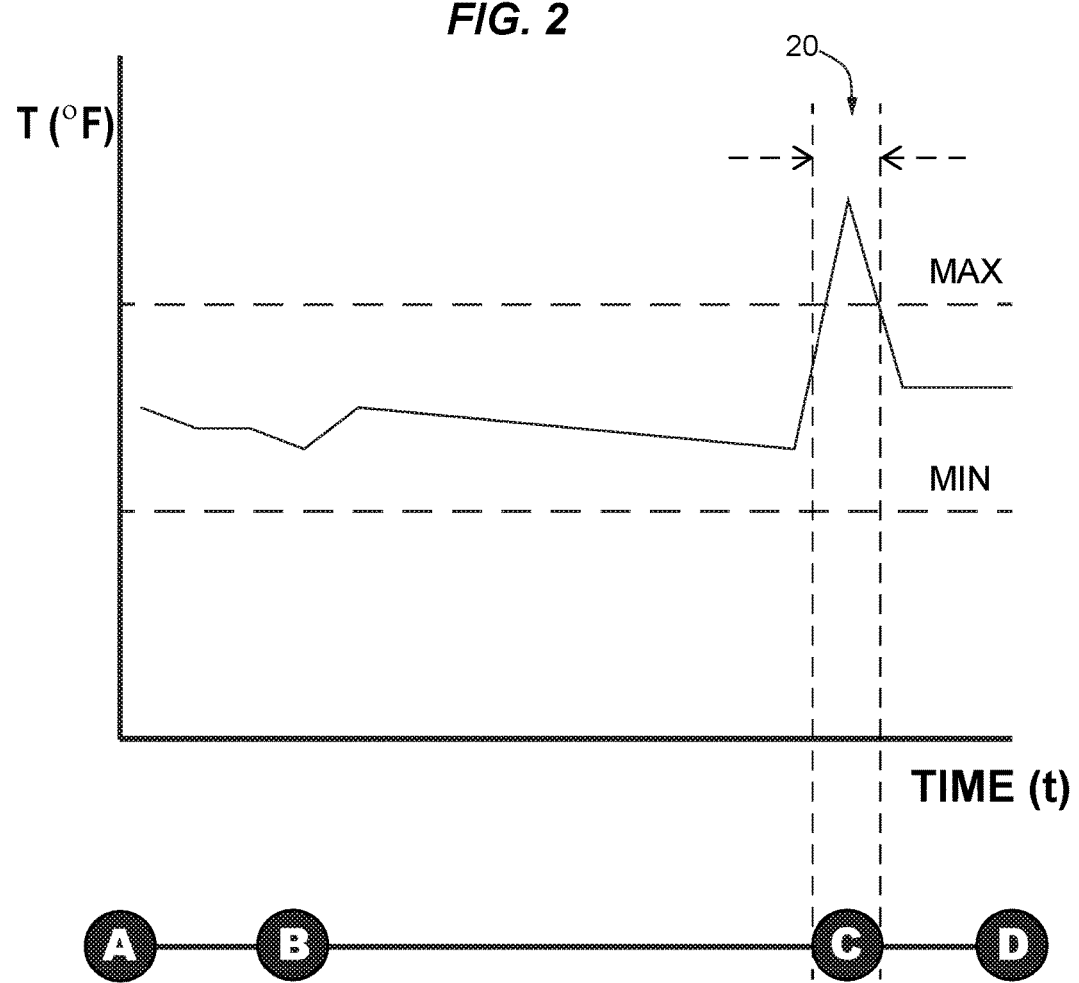
FIG. 2 is a plot of temperature vs time during a shipment, with one excursion outside an accepted range (defined by dashed lines labelled MIN and MAX). For reference, also shown are locations or waypoints A, B, C and D.

FIG. 2 is a plot of temperature vs time during a shipment, with one excursion outside an accepted range (defined by dashed lines labelled MIN and MAX). For reference, also shown are locations or waypoints A, B, C and D as introduced in FIG. 1. At the initial waypoint A, the shipment is assumed to be in compliance and the package temperature is within an accepted range having a maximum (MAX) and a minimum (MIN) threshold for rejection. Warning thresholds may also be programmed. The tracking device monitors temperature and stores the data in a memory on board. Each temperature point also includes a location and a time. The tracking device in some instances may calculate and report any incipient temperature deviations, and in other instances the host system will handle calculations and data analysis. The temperature data from the tracking device is sent by cellular radio to the host system.

At waypoint B, about 20% of the way through the trip, temperature is reasonable stable, but at waypoint C, there is a sharp spike 20 of overheating, perhaps because a window was rolled down and the air conditioning turned off. This triggers an alarm at waypoint C and also irreversibly sets a device status indicator to an alarm status so that it will be visibly flagged for the receiving agent.

When the shipment arrives at the destination (waypoint D), the receiving agent may already know that there has been an alarm, but will see the status indicator on the package and must decide whether the shipment can be accepted or not according to rules established by the receiver. Similar issues may be faced if the internal temperature of the shipment falls too low.

Damage to produce, for example, may follow an Arrhenius Equation that ties freshness to temperature and time, with higher temperatures resulting in wilting even after short times. Similarly, fish may become rancid if exposed to low but unacceptable temperatures for longer periods. Acceptance or rejection may be a black-and-white decision, but in some cases may require judgment based on experience and need for the shipment, resulting in an override of the flag.

Figure 3:
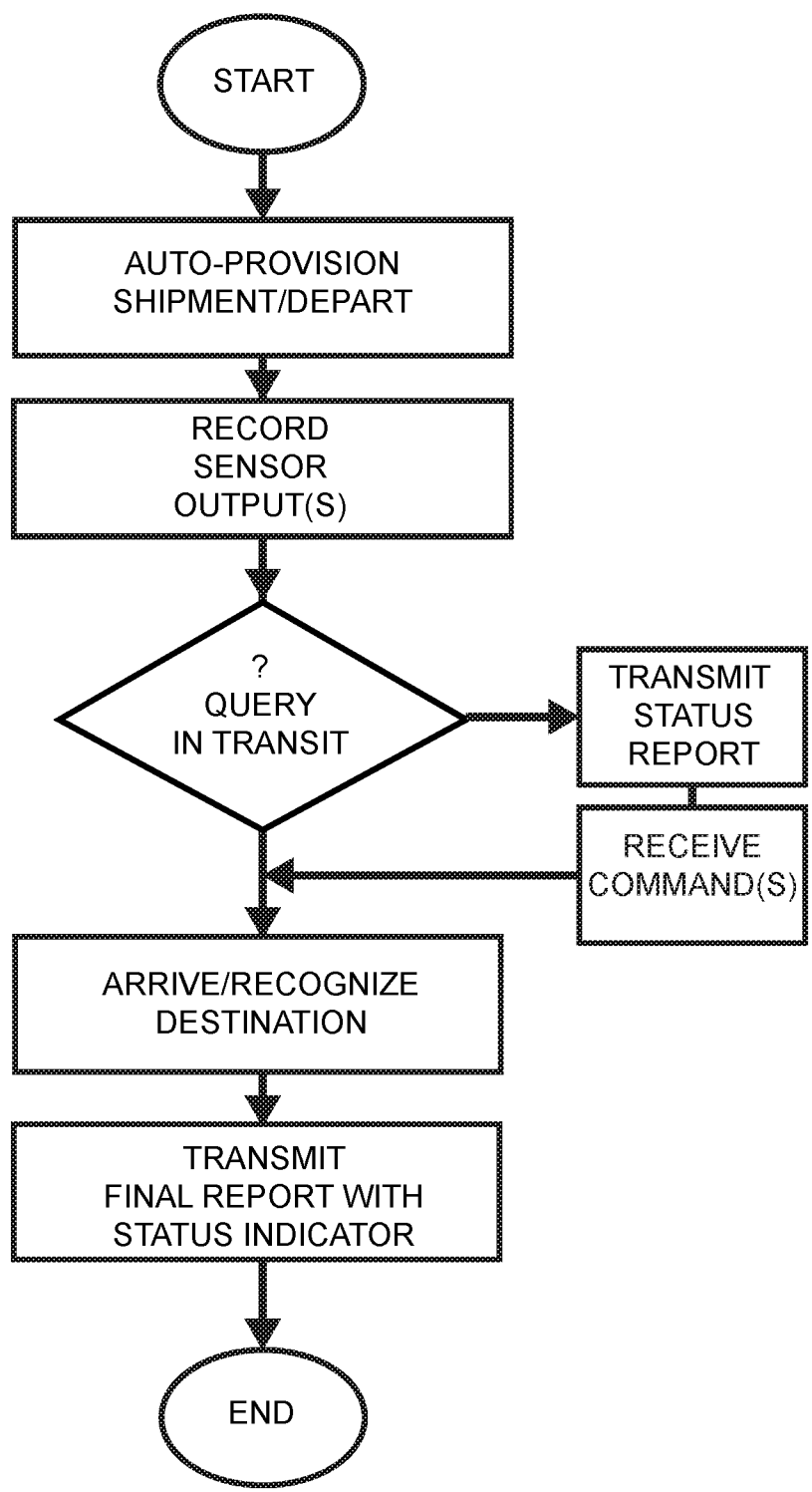
FIG. 3 depicts a flow chart of a tracking process for shipment of perishable goods.

FIG. 3 depicts a flow chart of a tracking process for shipment of perishable goods. Provisioning in this context means configuring the hardware unit to match the pertaining shipment that the hardware unit is attached to. So here are typical steps:

Carrier unpacks the cellular unit;

Carrier attaches the unit on the inside wall of the back of a refrigerated truck; Carrier pushes the button to start the unit For manual provisioning, carrier's agent would scan the barcode of the cellular unit, then scan the shipping manifest. The system will couple those two codes on the database so that later an administrative host can track that shipment on the system.

For automated provisioning, the carrier's agent doesn't scan anything. They just enter the details of the shipment like normal, when the device leaves the shipping dock, the cloud solution detects motion indicating that the device left. The system registers the time, location, and heading, and predicts the destination based on previously recorded or entered information, so as to automatically couple the CID of the cellular device to the SID of the shipment already in the system.

Figure 4A:
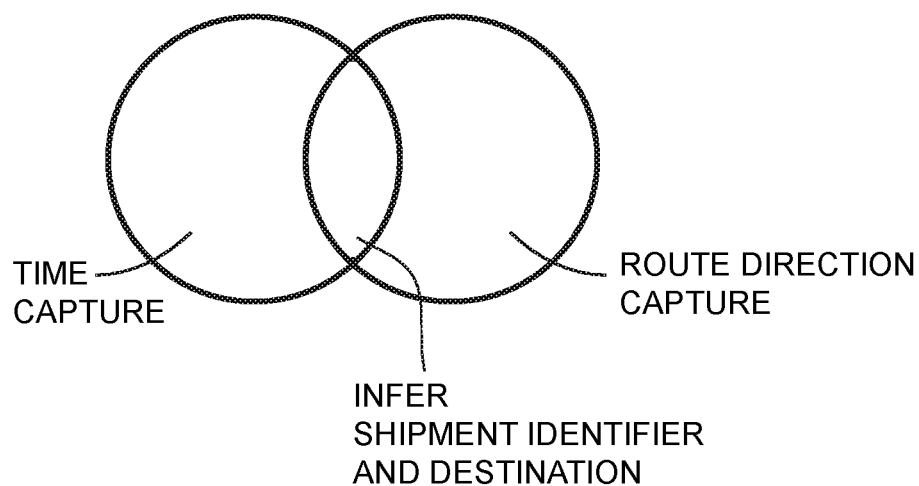
FIGS. 4A and 4B are views of two auto-provisioning schema for associating shipment identifiers and cellular identifiers of the cellular data loggers.
Figure 4B:
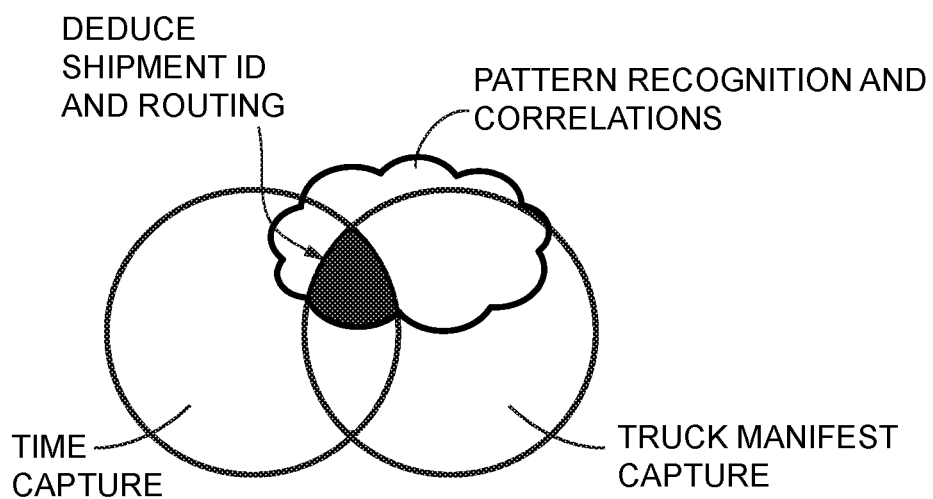

FIGS. 4A and 4B are views of two auto-provisioning schema for associating shipment identifiers and cellular identifiers of the cellular data loggers. In the first view (FIG. 4A), time of departure of the shipment and directional information are used to infer the shipment SID and the destination. The shipment with that SID is one on a list, but with simple clues, the system can determine that it is the shipment on the move and where it is going.

In a second model (FIG. 4B), time of departure of the shipment (from accelerometry data) is matched to a truck manifest already in the carrier's database. The cellular tracking device in motion is assumed to be the device associated with the shipment designated to receive special handling and monitoring. However, also useful is a truck or trailer number picked up by the transceiver of the cellular device from a transponder in the truck. From assigned routes listed by truck number, the system can infer a route, and the tracking device can be queried to match the expected route with the actual route. Given a match, the system assigns the package a SID from the truck manifest and associates the SID with the CID of the tracking device. Similarly, if a truck makes a left turn and the accelerometry data shows a counterclockwise motion of the tracking device, the system can associate the SID of the package with the CID of the tracking device, and then log environmental data from sensors on the tracking device with the corresponding package. Thus possible correlations made by the system are not limited to time of departure.

Figure 5:
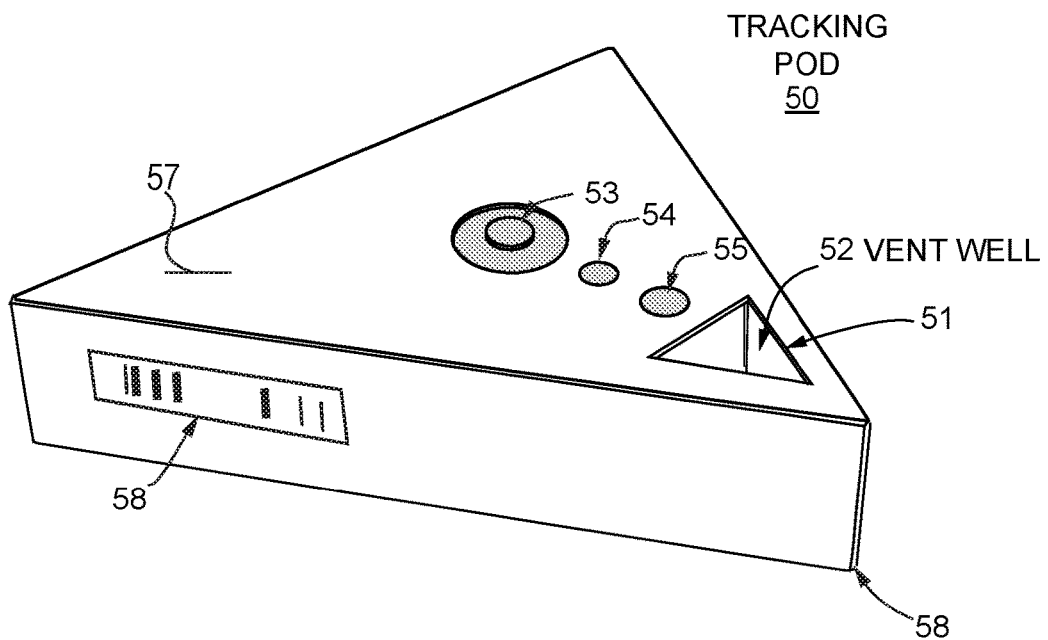
FIG. 5 is a perspective view of a cellular data logging device with cellular transceiver, start switch, status LED, and thermally isolated apical aspect.

FIG. 5 is a plan view of the device 50 (termed here a "tracking pod") with triangular body and sensor isolation bridge. At the top of the device is a triangular cutout 51 that permits free circulation of air in vent well 52 and isolates apex 58 from the main body of the device. By isolating the sensor at the apex, parasitic thermal masses and heat sources in the tracking device are less likely to cause false temperature readings.

The device housing includes a control surface 57 with status indicator LEDs 54 and 55, and a start button 53. The user interface is otherwise a virtual interface and is accessed through a cellular radio set having the needed software application installed. The status indicator is set up to illuminate in a green color when the device is activated, but to switch to red if the device is in an alarm state because the shipment has been mishandled, such as by a damaging jolt in the case of shock sensitive items or by an unacceptable temperature swing in the case of foodstuffs.

Also shown in this view is a supplemental bar code 58 on the tracking device as may be used for system validation during trials and troubleshooting in the event that the tracking device becomes electronically unresponsive for whatever reason.

Figure 6:
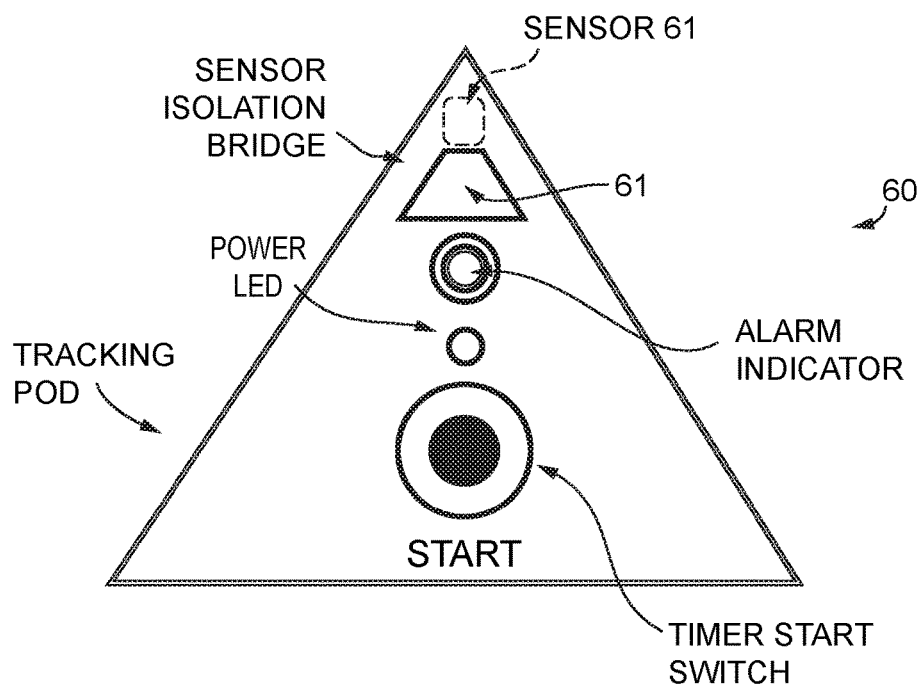
FIG. 6 is a plan view of the device with triangular body and sensor isolation bridges.

This cellular tracking device 60 includes a cellular transceiver, logic circuitry and memory (not shown), a thermal isolation construct 61, a start switch, power LED, alarm LED, and also a sensor 61 at the apex, shown here in plan view (FIG. 6). The aperture 61 at the top defines sensor isolation bridge elements on either side, so that the sensor is isolated from parasitic heat loads such as from the transceiver during radio transmissions. For temperature, the sensor may be a thermistor or a thermocouple, for example. Moisture, pressure, and shock may also be monitored.

Figure 7A:
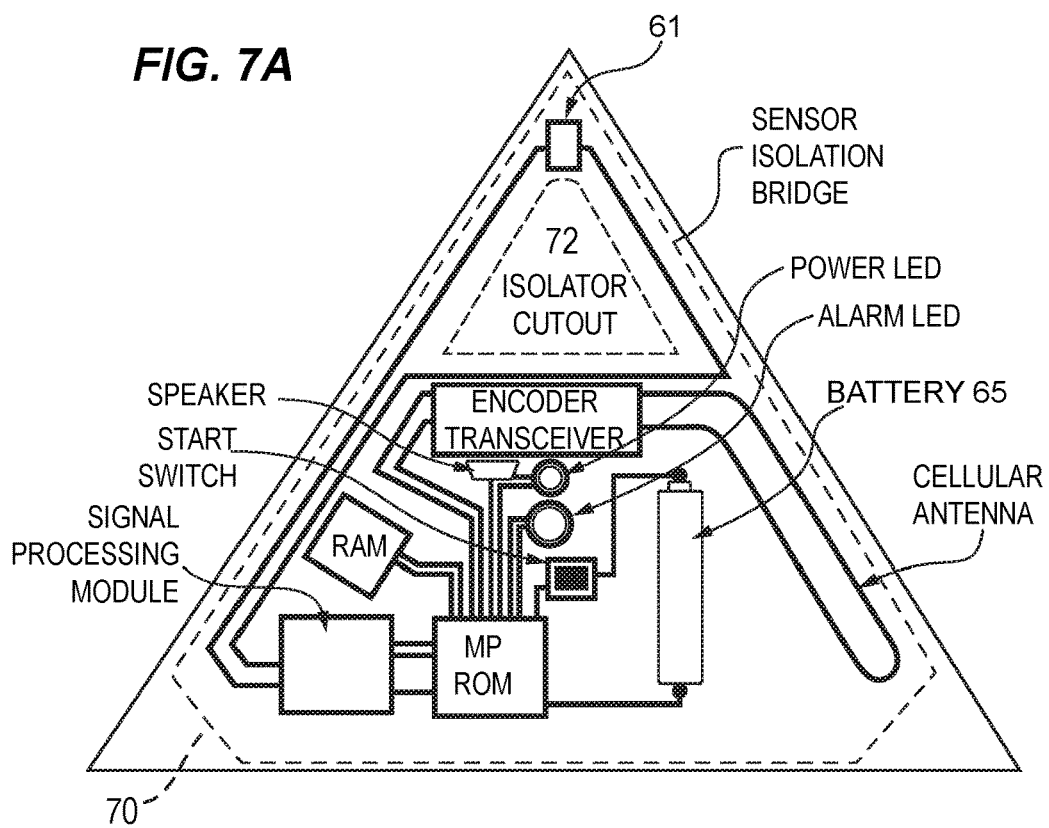
FIG. 7A is an internal schematic of the electronics.

The housing itself is designed to enclose a printed circuit board 70 supporting the circuit shown in FIG. 7A, an internal schematic of the electronics. The printed circuit board includes a cutout larger than but corresponding to the isolation aperture 72 of the housing. A temperature sensor 61 is mounted at the thermally isolated apex of the triangular body. Also labelled are other logic circuit elements, a signal processing module, an encoder transceiver, a cellular antenna, RAM memory, ROM memory containing processor-executable program instructions, a start switch, a speaker, a power LED, an alarm LED, and a coin battery 65. Microprocessor MP executes an instruction set configured to collect and record data from the sensor(s) and to transmit and receive transmissions to and from cellphone towers. These towers also provide location information for the tracking device by a process of triangulation known in the art.

Included on the PCB are memory, signal processing, encoding, transmission, reception and antenna devices, coin battery, any combination of which may be integrated in a single chip or with the microprocessor as desired. The microprocessor typically is provided with a combination sensor having tri-axis accelerometry, gyroscopes, a compass magnetometer, and the device may be equipped with a larger package of sensors as needed.

In some embodiments, the temperature sensor 61 detects or measures the temperature and outputs a temperature signal that represents the measured temperature to an A/D converter or encoder. The encoder converts the analog temperature signal to a digital value. The encoder then sends the digital value that represents the temperature to the microprocessor, which stores the value to a memory as a chronological history of the shipment. Location of the temperature measurement may also be stored. Alternatively, the digital value may be sent directly from the encoder to the memory. In yet other embodiments, the digital value may be sent directly to a host via the cellular radio transceiver, using any of the accepted communications protocols for data transmission. In still other embodiments, the temperature sensor may output a digital temperature value to one or more of the microprocessor, memory device, and radio.

Furthermore, the encoder may also receive other analog signals, as from other sensors, convert these signals to digital values, and send these digital values directly to the memory for storage or to the processor. In some instances, temperature and accelerometric signal originating from a microprocessor with integrated sensor package may not require an encoder and may be suitable for direct transmission by the radio or for signal analysis and reporting.

The device may include sufficient calculation power to evaluate signals versus an acceptable range programmedly defined by an operator through a user interface and may be configured to go into alarm state in real time if the shipment departs from the accepted range. In alarm state the status indicator shows a fault. More preferably, a warning signal may be transmitted before the threshold is crossed, and systems may be in place to offer remediation or at least time to react.

However, in any alarm, the cloud host is configured to generate and transmit the alarm state to the cellular device, and the status indicator on the cellular device is operated under control of the cloud host. It is the cloud that triggers the alarm state, generally as programmed by the operator of an automated administrative host. Flexibility at the level of the cloud host in establishing an alarm condition is preferred to fixed logic in the cellular device because shipments of different kinds may differ in their handling requirements. Software is more flexibly administered and more readily updated. In some instances, a shipping agent will review the data, which the system may have flagged and sent for real time review, before making a judgement to trigger an alarm.

Also shown here is a start switch for connecting the microprocessor to a coin battery, in which the coin battery is fitted in a cutout in the PCB. Connecting the battery to the microprocessor initiates the program and begins data logging and a call home that will assign the CID of the transceiver to a shipment. Battery life is configured as needed for typical applications that may involve data logging over a few hours to a few weeks. Not shown here are internal details of the housing, but the PCB is supported and is designed to be readily inserted inside the housing before it is sealed, such as by ultrasonic welding. While it may be necessary for example to expose a humidity sensor to the outside environment, the PCB itself is generally sealed from ambient moisture.

Figure 7B:
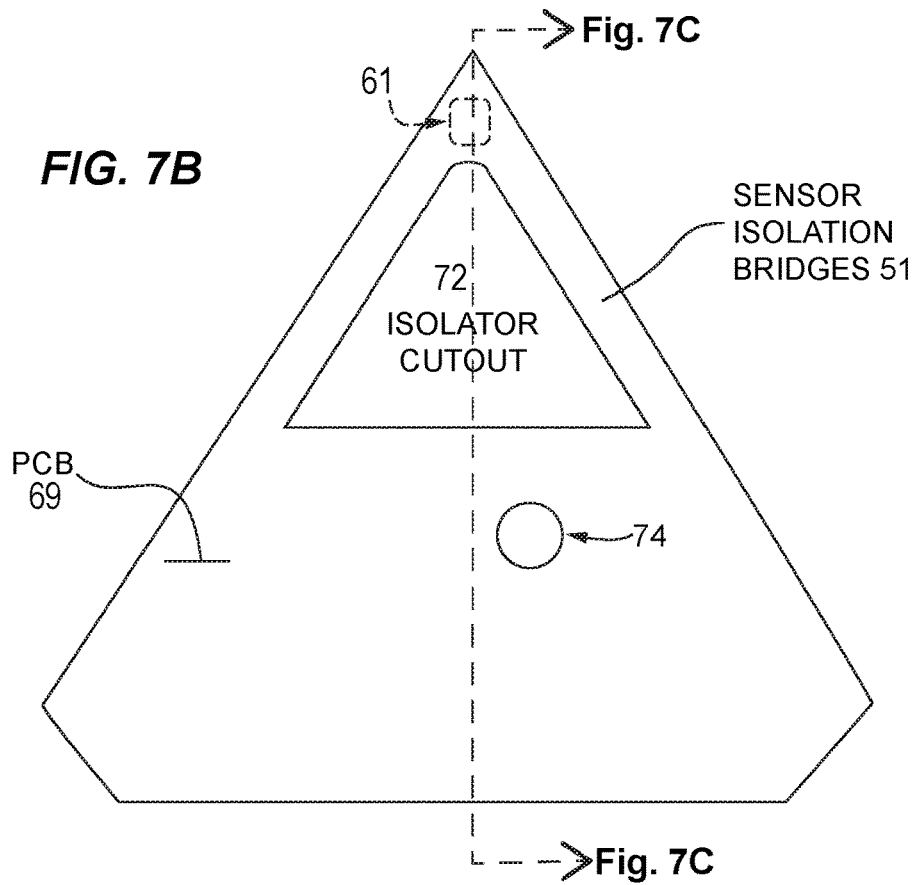
FIG. 7B shows the general shape of the PCB with bilateral sensor isolation bridges. Also shown is a sectional plane detailed in FIG. 7C through the body and the electronics. An alternate section view through the PCB is shown in FIG. 7D.

FIG. 7B shows the general shape of the PCB 69 with sensor isolation bridge. Two cutouts are shown, one for the coin battery 74 and the other 72 that splits the PCB into a base body and an isolated apex on which a temperature sensor 61 is mounted. Thus the PCB defines not only elements of positive support for the circuitry, but also negative cutout elements that improve the intended function and make the device more compact. Also shown is a section cutline for detail illustrated in FIG. 7C, as would appear if an AAA cell (77) were mounted by clips to the upper face of the PCB.

Figure 7C:
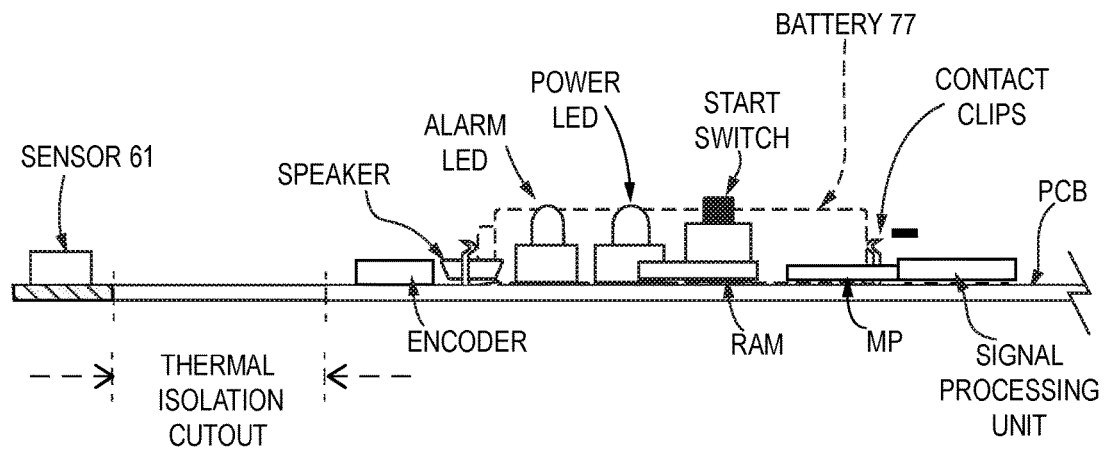
Figure 7D:
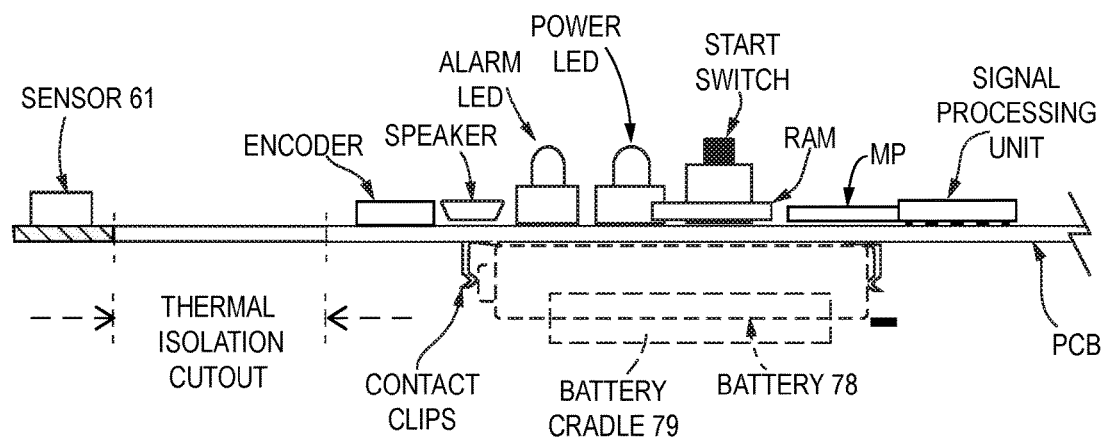

FIG. 7C is a sectional view through a typical PCB. In this elevation view, final assembly is a simple process of inserting a AAA battery into the contact clips above and below the PCB. The start switch is configured so that electrical leakage during storage is negligible but supplies full power to the circuit and sensor is provided when the unit is activated. The temperature sensor 61 is connected to the microprocessor by two traces as shown in FIG. 7A. An alternate section view of the electronics is shown in FIG. 7D. Here the battery 78 is mounted under the PCB and includes a battery cradle 79 that is molded into the device housing (not shown). Signal processing units (sometimes termed DSPs) are useful in digitizing sensor output and separating meaningful patterns from noise.

Figure 8:
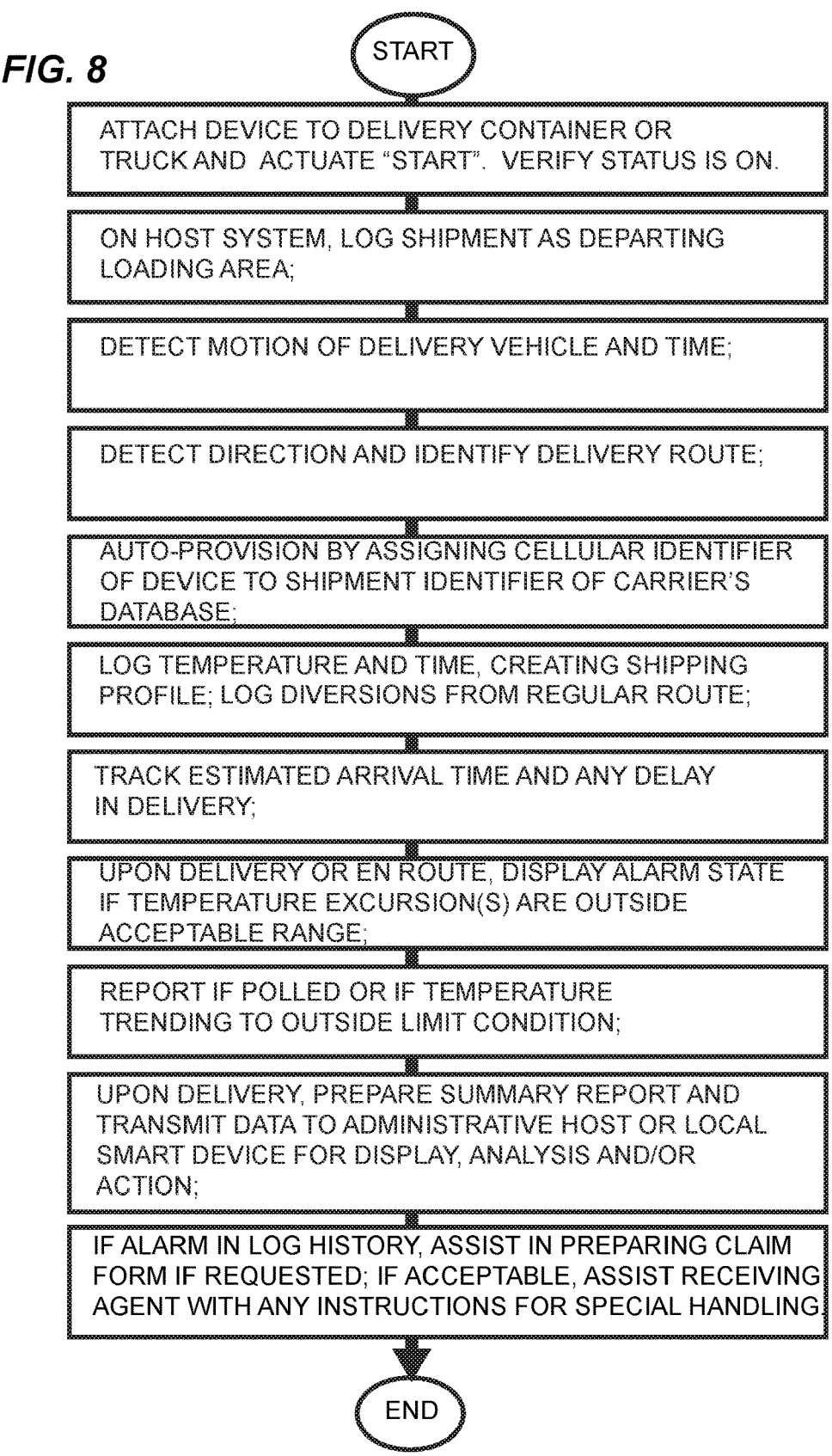
FIG. 8 is a schematic of the steps of a method for operating a cellular data logging system so as to monitor environmental conditions, location, and to automate data provisioning and goods acceptance (or rejection) by a receiver's agent.

FIG. 8 is a schematic of steps of a method for operating a cellular data logging system so as to monitor environmental conditions, location, and to automate data provisioning and goods acceptance (or rejection) by a receiver's agent.
  ATTACH DEVICE TO DELIVERY CONTAINER OR TRUCK AND ACTUATE "START". VERIFY STATUS IS ON;
  ON HOST SYSTEM, LOG SHIPMENT AS DEPARTING LOADING AREA;
  DETECT AND CONFIRM MOTION OF DELIVERY VEHICLE AND TIME;
  DETECT AND CONFIRM DIRECTION AND IDENTIFY DELIVERY ROUTE;
  AUTO-PROVISION BY ASSOCIATING CELLULAR IDENTIFIER (CID) OF DEVICE WITH SHIPMENT IDENTIFIER (SID) IN CARRIER'S DATABASE;
  LOG TEMPERATURE AND TIME RECURSIVELY TO CREATE SHIPPING PROFILE;
  LOG DIVERSIONS FROM REGULAR ROUTE;
  TRACK ESTIMATED ARRIVAL TIME AND ALERT TO ANY DELAY IN DELIVERY;
  UPON DELIVERY OR EN ROUTE, DISPLAY ALARM STATE IF TEMPERATURE EXCURSION(S) ARE OUTSIDE ACCEPTABLE RANGE;
  SEND REPORT IF POLLED, OR IF TEMPERATURE EXCURSION IMMINENT OR OUT OF LIMITS;
  UPON DELIVERY, PREPARE SUMMARY REPORT FOR DISPLAY, ANALYSIS AND ACTION;
  ASSIST RECEIVING AGENT TO HANDLE THE SHIPMENT PROPERLY AS PER SPECIAL HANDLING INSTRUCTIONS;
  IF REJECTED BY RECEIVING AGENT, PREPARE AUTOMATED CLAIM WITH DOCUMENTATION AND NOTIFY SHIPPER AND SENDER.

All of the above actions with the exception of pressing the start switch and attaching the device to the package are performed without human intervention, an advance in the art. Some steps are optional. Some steps are performed by the cellular device, other steps are performed by the administrative host, or the system operating as a whole. In a preferred embodiment, the system operates to generate an alarm condition based on data received from the device, and to then trigger a local alarm display or notification on the device itself. Local alarms typically would be a light or a buzzer of the status indicator package. Remote alarms may be configured by the system according to the needs of the user.

Figure 9A:
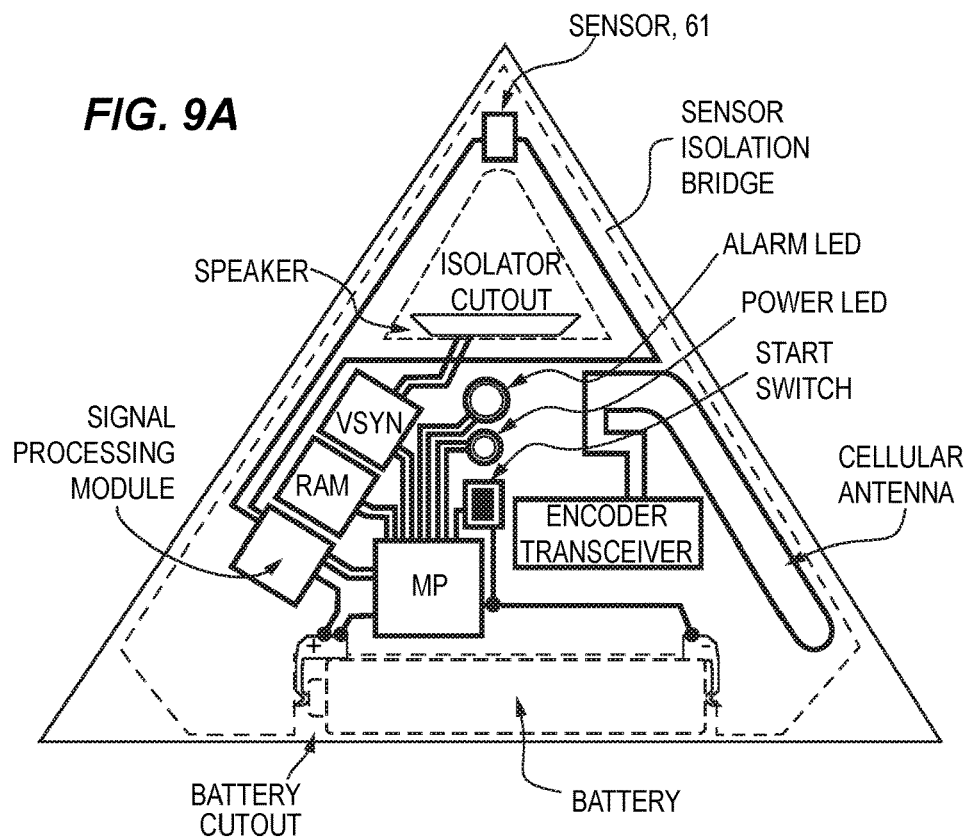
FIGS. 9A and 9B illustrate a use of the sensor isolation cutout to shelter a delicate speaker orifice from impacts and intrusions that would occur if the speaker were place on an exposed exterior surface of the cellular device. Unlike the embodiment of FIGS. 7C and 7D, here the battery is mounted in a slot at the edge of the PCB, as can speed assembly and stabilize the battery/board interconnect.
Figure 9B:
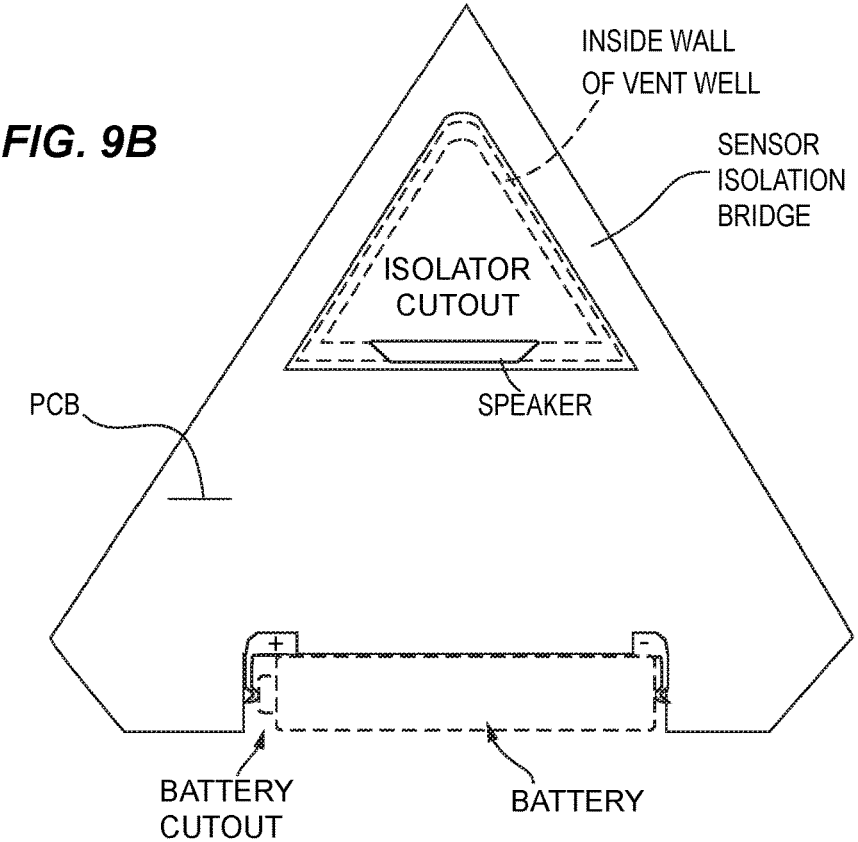

FIGS. 9A and 9B illustrate a use of the sensor isolation cutout to shelter a delicate speaker orifice from impacts and intrusions that would occur if the speaker were place on an exposed exterior surface of the cellular device. In this embodiment, a voice synthesizer and higher quality diaphragm and diaphragm driver are provided to simulate a female voice in the 300-400 Hz range. Thus the speaker can supply not only alarm beeps and whistles, but also detailed directions from either stock memory on board or directly from a cloud host via the cellular link. In a preferred embodiment, a two-way conversation can be conducted through the cellular device as disposable cell phone. Unlike the embodiments of FIGS. 7C and 7D, here the battery is mounted in a slot at the edge of the PCB, as can speed assembly and stabilize the battery/board interconnect.

Figure 10A:
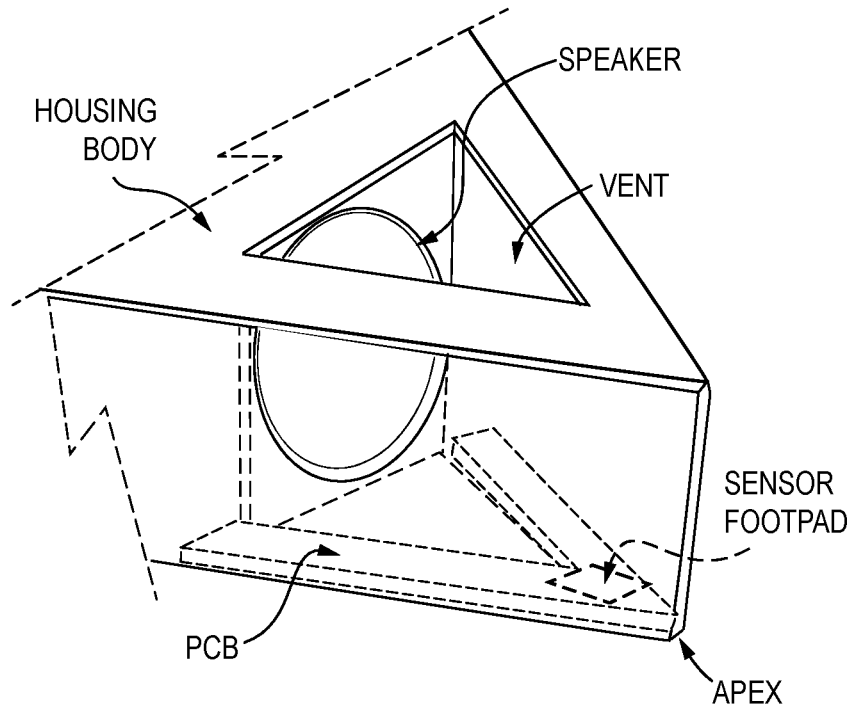
FIG. 10A is a view of an apical aspect of a cellular device with triangular body and sensor mounted at an apex of the body where it can be thermally isolated from heat generated by the radio and microprocessor. Advantageously, this also provides for a protected opening for the speaker.

FIG. 10A is a view of an apical aspect of a cellular device with triangular body and sensor mounted at an apex of the body where it can be thermally isolated from heat generated by the radio and microprocessor. Advantageously, this also provides for a protected opening for the speaker and serves to configure a sound box for the speaker, as is well known to improve tonal quality and increase apparent volume. A vent with internal walls extends from the top of the housing body to the bottom and helps to equilibrate the sensor with surrounding air. The sensor may be a thermocouple, a thermistor, a resistance temperature detector (RTD), or a temperature differential diode pair.

Figure 10B:
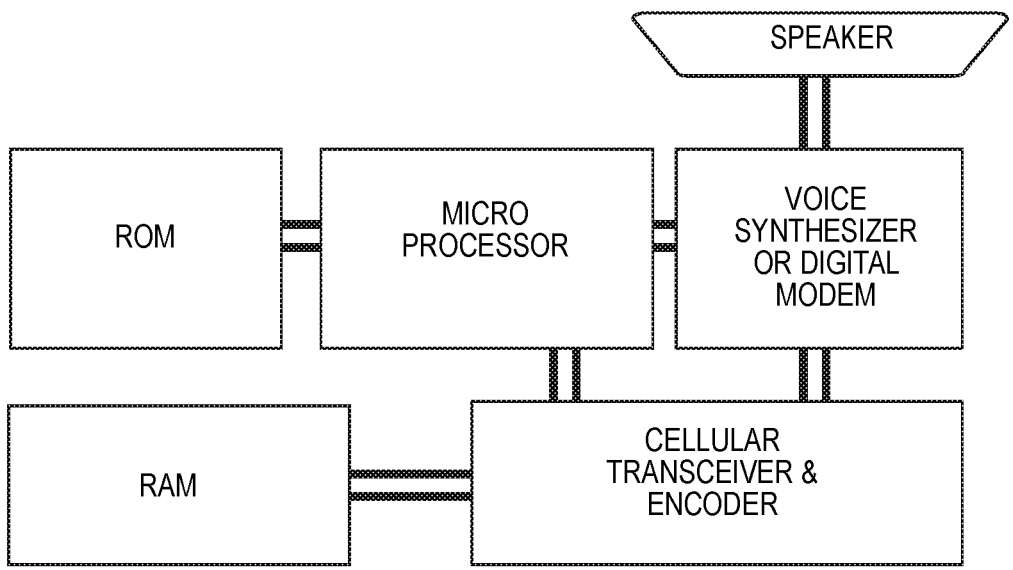
FIG. 10B is a schematic of the speaker driver circuit.

FIG. 10B is a schematic of the speaker driver circuit. Advantageously, an alert can be sounded on the speaker when the microprocessor detects a fault condition, and also when the system host detects a fault condition. Faults may be temperature deviations, environmental conditions out of range more generally, deviations from expected route or milestone in time. The system can "call home" to report trouble, for example, and in some instances can prompt action that will avert trouble.

Figure 11:
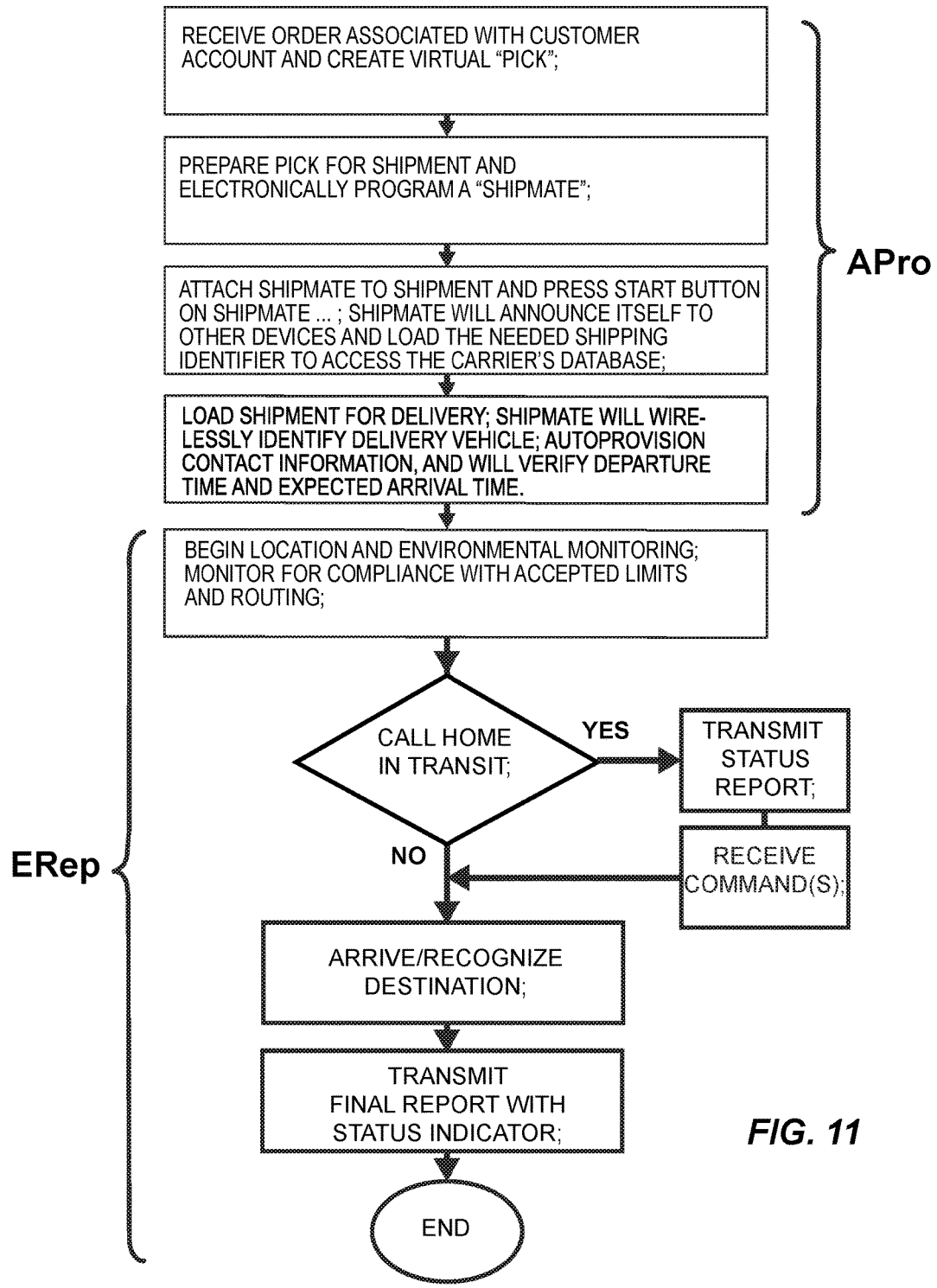
FIG. 11 describes steps in a method in which the innovation includes a first advance in automation by providing for auto-provisioning (APro) and a second advance that provides for automated reporting (ERep) and disposition of certain deviations. Elements of machine learning and artificial intelligence are developed in this schematic.

FIG. 11 describes steps in a method in which the innovation includes a first advance in automation by providing for auto-provisioning (APro) and a second advance that provides for automated reporting (ERep) and disposition of certain deviations, such as events that would require that an insurance claim be submitted while en route, updating the customer, and announcing pending arrival, and preparing documentation as to the shipment's condition on arrival. Elements of machine learning and artificial intelligence are developed and incorporated in this schematic. In the flow diagram, the cellular tracking device is referred to as a "shipmate".

In FIG. 12A, a sample run from Chicago to a destination in Seattle is shown as would be mapped on a screen 120 of a smart device. The solid lines represent land routes, including an extended cross-country truck route; the dotted is air freight, and is diagrammed here as part of an alternative air/truck combination route. Depending on the customer's instructions, the shipment could have gone by truck (solid line) or by air (dotted line). Temperature data is reported in a map view as shown. Either way, the cellular device will collect and log sensor data, providing evidence of conditions experienced by the shipment while in transit. The system monitors the sensor data and will analyze the data during transit or as the shipment approaches the destination (here Seattle). If an alarm condition is detected, the system can actuate a status indicator display on the tracking device (so that persons receiving the shipment can see or hear it) and also can generate a remote alarm and send a link to the alarm condition to smart devices involved in managing the shipment. A heatmap showing trends and waypoints as specific markers can also be selected for display. The lower table is summary data of shipping conditions during the trip and can be updated as the drive progresses.

This user interface 121 also includes controls for selecting other data and analyses, and for showing alerts if any. The interface can be installed on smart devices as an application, or can operate as a browser driven graphical user interface.

A temperature profile over the duration of the trip is shown in FIG. 12B. This is read from right-to-left (position-wise) on the map but left-to-right (timewise) in the graph. The data log begins in Chicago on a Tuesday and ends on the Wednesday of the following week. It can be seen that about a week into the trip, a major failure 126 occurred in the cooling system and results in temperatures rising to ambient—likely damaging the goods. All this is digested by the system so that the needed alerts and insurance paperwork is generated and ready when the shipment arrives at its destination. One can see that this system also works without a driver, so that a driverless vehicle can be engaged with the same result. With this kind of advance work done by the system automatically while the shipment is still on the road, the parties to the shipment can arrange for a replacement shipment while the first truck is still enroute, and even turn the first truck around so as to return the spoiled materials to their point of origination or to a suitable waste disposal site.

In the first phase of any auto-provisioning process, the shipment needs to be associated with a "unique shipping identifier" that references bill of lading or manifest in a database. The cellular device has a unique identifier that need to be associated with the unique shipping identifier. The process of crossing platforms so as to link a database entry (of the unique shipping identifier) in a first database and a database entry (of the cellular identifier and associated trip sensor logging) in a second database is termed "auto-provisioning".

The second phase is about data logging and reacting as the shipment progresses: it is about monitoring and management while in transit, and requires that the device keep a record of waypoint, timepoint and sensor data, prepare reports when prompted or at regular intervals, alert if there are any deviations, and announce an arrival so that the appropriate receivers and staff are notified for any special handling that may be required on delivery, or at least that. The system may also be configured to accept and process commands while in transit, such as orders to divert to a new destination, to effect repairs, or to effect expedited delivery by switching from truck to air, for example.

Interestingly, we see a series of small spikes 124 that occur along the way from Chicago to Seattle. These spikes are the defrost system kicking in and pose no problem for the carrier or the customer. This is actual data of a trip monitored by a cellular tracking device in an 8 day trip by truck.

The final status report may be all good, and the system report will be clear. But if analysis shows that there are deviations from acceptable limits, then there may be a need to file an insurance claim, and on command the system is able to prepare and process a claim. The claim may be handled on-line with insurance partners. Filing a claim involves assembling and formatting administrative data already in the system plus a record of the deviation in sensor output, and can be electronically presented to an insurer, saving large amounts of effort.

Analysis of sensor output faults is generally done on the cloud, system controls also on the cloud but can be communicated to the device, such as sensors to turn on, sample rates etc. If there is a temperature spike, for instance, the actual alarm parameter may be different from frozen vs fresh goods. So the cloud determines the fault limit depending on input from the shipper and customer. Similarly, operation at the cloud level ensures that alarm notification routing will be directed to a current and up to date list of carrier or customer representatives.

Control functions are processed on the dashboard and a command to the device will be triggered by the cloud or by an agent operating through the cloud. The cloud has much more information about the context and nature of the cargo. The device is always logging data, but the cloud decides if a threshold is crossed. That way the same device can be used for many different kinds of shipments and different thresholds without modification to device. In some instances, an experienced operator's judgement may be needed, but with machine learning, the system will acquire the algorithms to make correct judgements.

FIG. 13A is a graphical concept of a set of slave sensor probes 132, each having short wave radio capability (typically bluetoothed radiobeacons), that can be distributed throughout a volume of a shipment, as suggested here on a pallet, and are set up to report their sensor data to the wireless data logger 150, where in turn the data is broadcast to a cellular network. The slaved probes are part of a local mesh network and includes the cellular data logger for the final upload to a wide area network or to an Internet host.

More detail of a slave probe is shown in FIG. 13B. A use for measuring humidity is suggested in FIG. 13C. Thus the systems are not exclusive to cold chain monitoring and may be used to monitor and log other sensor feeds, such as sensors related to hazardous or dangerous materials shipping.

FIG. 14 is an overview of a system method for monitoring and managing shipments. Here the cellular device is attached to a shipment and powered up. It has a battery with enough power to make the trip. While enroute, the device will monitor and log an environmental condition and can receive and log position and time with the sensor data, or position may be logged by the system. Logic is provided to run a simple decision tree, here with three branches. In a first case (right leg), all is normal and the system need only prepare an electronic report with an estimated time of arrival addressed to the appropriate receiver or receiver's agent and copied to an administrative host and/or the shipper. At another extreme (left leg), an alarm condition is identified, sensor data has deviated from an accepted range or crossed a threshold, and an outside limit protocol is triggered causing a local alarm when the shipment arrives (at a local level, the alarm will be silent until arrival and become audible when being unloaded). The system however, will begin the process of notification of interested parties well before the shipment reaches its destination. In a middle leg, the system has the power to detect sensor trends that spell impending trouble and to take preventative action, or at least to report the impending deviation and to poll for a command to prevent damage by taking corrective action. Thus the system unexpectedly provides more than mere data logging, but instead is in intimate contact with interested parties over a preferred cellular network, and can solicit help if human intervention is needed, an advance in the art.

The above specification, examples, and data provide a complete description of the manufacture and use of the composition of the invention. Since many embodiments of the invention can be made without departing from the spirit and scope of the invention, the invention resides in the claims hereinafter appended.

INCORPORATION BY REFERENCE

All of the U.S. Patents, U.S. Patent application publications, U.S. Patent applications, foreign patents, foreign patent applications and non-patent publications referred to in this specification and related filings are incorporated herein by reference in their entirety for all purposes. U.S. Pat. RE36,200 is incorporated by reference for all that is taught and provided as background.

SCOPE OF THE CLAIMS

The disclosure set forth herein of certain exemplary embodiments, including all text, drawings, annotations, and graphs, is sufficient to enable one of ordinary skill in the art to practice the invention. Various alternatives, modifications and equivalents are possible, as will readily occur to those skilled in the art in practice of the invention. The inventions, examples, and embodiments described herein are not limited to particularly exemplified materials, methods, and/or structures and various changes may be made in the size, shape, type, number and arrangement of parts described herein. All embodiments, alternatives, modifications and equivalents may be combined to provide further embodiments of the present invention without departing from the true spirit and scope of the invention.

In general, in the following claims, the terms used in the written description should not be construed to limit the claims to specific embodiments described herein for illustration, but should be construed to include all possible embodiments, both specific and generic, along with the full scope of equivalents to which such claims are entitled. Accordingly, the claims are not limited in haec verba by the disclosure.

We claim:

1. A wireless system operative in sensing a temperature, which comprises:
   a radiotag having a temperature sensor and a processor circuit on a circuit board, the circuit board defines a first lateral edge and a second lateral edge, the processor circuit is capable of wireless communication with a cellular network;
   characterized in that
   the temperature sensor is operatively coupled to the processor circuit by a first trace and a second trace and is separated from the processor circuit by a cutout in the circuit board, the cutout defines a first connective sensor isolator bridge strip configured to support the first trace on the first lateral edge between the temperature sensor and the processor circuit and a second connective sensor isolator bridge strip on the second lateral edge configured to support the second trace between the temperature sensor and the processor circuit, the first and second connective sensor isolator bridges are contralaterally disposed on the circuit board and separated by the cutout; and,
   a housing enclosing the circuit board, the housing attachable to a shipment.

2. The system of claim 1, said housing having an exterior shell and an internal wall, the interior wall extends through said cutout from top to bottom of said housing, thereby defining a vent well configured as a sound box in in said housing.

3. The system of claim 2, wherein the radiotag comprises a speaker mounted in said sound box, wherein said processing circuit is operatively linked to said speaker and said speaker is configured to acoustically propagate an acoustic alarm notification if a sensor signal outputted from said temperature sensor to said processing circuit deviates from an accepted limit or range.

4. The system of claim 3, wherein the radiotag comprises a cellular transceiver, and wherein said sensor signal output is enabled to be cellularly transmitted to a system administrator on said cellular network, said system administrator having a function to evaluate said sensor signal and command said alarm notification if said sensor signal output deviates from an accepted limit or range.

5. The system of claim 4, wherein said processing circuit is configured to upload an output from said temperature sensor as a function of time and location to a remote server, said output defining a shipping profile history, when a cellular "ping" is detected from a cellular tower, when a cellular tower detects a cellular ping from said cellular transceiver and transmits an order to said cellular transceiver to upload said shipping profile history, or when a temperature sensor output threshold defined as either too cold or too hot, is crossed.

6. The system of claim 1, wherein the radiotag is attachable to a package and is configured for auto-provisioning grocery deliveries.

* * * * *